US005530575A

United States Patent [19]
Acampora et al.

[11] Patent Number: 5,530,575
[45] Date of Patent: Jun. 25, 1996

[54] SYSTEMS AND METHODS FOR EMPLOYING A RECURSIVE MESH NETWORK WITH EXTRAPLANAR LINKS

[75] Inventors: Anthony Acampora, New York, N.Y.; Glenn C. Brown, Sierra Madre, Calif.

[73] Assignee: The Trustees of Columbia University, New York, N.Y.

[21] Appl. No.: 303,485

[22] Filed: Sep. 9, 1994

[51] Int. Cl.⁶ .................................................. H04J 14/02
[52] U.S. Cl. .......................... 359/128; 359/123; 359/125; 359/137; 370/94.3
[58] Field of Search ....................................... 359/109, 118, 359/123, 125, 128, 137, 139; 370/94.3

[56] References Cited

U.S. PATENT DOCUMENTS

| | | | |
|---|---|---|---|
| 4,797,882 | 1/1989 | Maxemchur | 270/94.3 |
| 5,128,789 | 7/1992 | Abramovitz | 359/128 |

OTHER PUBLICATIONS

Kartalopoulos, "Disaster Avoidance in the Manhattan Fiber Distributed Data Interface Network", IEEE in Houston–Globecom '93, vol. 2, pp. 680–685, 29 Nov.–2 Dec. 1993.
Logically Rearrangeable Multihop Lightwave Networks by Jean–Francois P. Labourdette, Anthony S. Acampora, reprinted from IEEE Transactionson Communications, vol. 39, N. 8, Aug. 1991.
Integrated–Optic Acoustically–Tunable Filters for WDM Networks by David A. Smith, Jane E. Baran, John J. Johnson, and Kwok–Wai Cheung, IEEE Journal on Selected Areas in Communications, vol. 8, No. 6, Aug. 1990.

T. E. Bell, "Technology 1991: Telecommunications," IEEE Spectrum, vol. 28, Jan 1991.

*Primary Examiner*—Leo Boudreau
*Assistant Examiner*—Kinfe-Michael Negash
*Attorney, Agent, or Firm*—Brumbaugh, Graves, Donohue & Raymond

[57] ABSTRACT

Techniques for making a recursive mesh network for connecting a varying number of access stations within a service area is disclosed. The techniques include (a) dividing the service area into M×N rectangular regions, having (M+1)×(N+1) corners, which cover the entire range of the service area; (b) placing an access station at an available region corner whenever a new access station becomes available, and connecting the access station to its corresponding optical connection paths, until (M+1)×(N+1) access stations have been so connected; (c) determining, for each additional new access station, which region the additional new access station falls within; (d) if this determined region has not been divided, dividing the determined region into S×T sub-regions; (e) if the divided determined region has less than (S+1)×(T+1) access stations within it, placing the additional new access station at an available sub-region corner in the region and connecting the new additional access station to at least one other access station within the same region; and (f) if the divided determined region has (S+1)×(T+1) access stations within it, repeating steps (c)–(f) with respect to that sub-region until the new additional access station can be connected. Also disclosed are an optical telecommunications network and techniques for routing information in a recursive mesh network.

38 Claims, 17 Drawing Sheets

SYSTEMS AND METHODS FOR EMPLOYING A RECURSIVE MESH NETWORK WITH EXTRAPLANAR LINKS

The U.S. Government gas certain rights in this invention pursuant to the terms of contract No. CDR-88-1111 awarded by the National Science Foundation.

BACKGROUND OF THE INVENTION

1. Field of the Invention

The present invention relates to local, wide area, and national telecommunications networks and particularly relates to telecommunications networks using fiber optic technology.

2. Description of the Related Art

Over the past two decades, the rapid deployment of local and long-haul transmission systems using single mode optical fibers has had profound impact on the quality, utility, and variety of telecommunications equipment and services. The emergence of the optical fiber as the transmission medium of choice stems from several key attributes: low loss, low dispersion, and low cost (silica, the essential raw material, is abundantly available). Collectively, these fiber optic attributes permit point-to-point movement of greater volumes of information over greater unrepeated distances, when compared against other types of transmission media such as copper cabling or radio. Local and Metropolitan Area Data Networks such as the Fiber Distribution Data Interface (FDDI), efficient subscriber loop systems, and the Synchronous Optical Network specification for core network equipment standardized from the physical through the Operations, Administration, and Maintenance (OA&M) layers are but a few examples of the range of capabilities enabled by optical fiber-based transmission systems. The availability of the Erbium Doped Fiber Amplifier (EDFA), described in T. E. Bell, "Technology 1991: Telecommunications," IEEE Spectrum, Vol. 28, January 1991, has only served to heighten the appeal of these systems.

More recently, considerable interest has developed with regard to another, as yet untapped, attribute of single mode optical fiber: its enormous bandwidth. Even if we conservatively confine our attention to the narrow optical window centered around 1.55 microns coinciding with the operational range of the EDFA, a potentially addressable bandwidth of about 5 terahertz exists. This enormous potential has suggested the use of multiwavelength technology to increase the capacity of each fiber by a factor of at least 10, and perhaps by as much as 100.

If each wavelength-multiplexed channel is operated at the order of a multigigabit/sec. rate, then a single fiber link may provide a capacity which is much greater than that needed on a point-to-point basis. The objective, then, is not merely to magnify the capacity between a single transmitter/receiver pair but, rather, to create an optical medium containing many interconnected fibers such that each wavelength injected by a single transmitting station is independently routed to one of many distinct receivers. The medium would also contain optical power splitters, combiners, wavelength selective filters, and wavelength multiplexers and demultiplexers, and would provide the basis for a multiuser lightwave network, as opposed to an optical transmission system. When coupled with techniques for re-using the same wavelengths on disjoint fibers and with the deployment of EDFAs to offset optical combining and splitting losses, an approach such as this may provide a limitless supply of information-bearing wavelength multiplexed channels. The lightwave network, then, becomes a viable platform for a new wide-area telecommunications infrastructure, scalable to very large configurations both in geographical size and number of users served, and capable of providing a plethora of bandwidth-intensive multimedia services to large and small users alike.

In the telecommunications context, a lightwave network might appear as shown in FIG. 1, and include a shared optical medium 100, and geographically dispersed access stations (1 through N, where N is an integer) which contain the ports 101 through which users attach to the network. Here, each user might be a processor, advanced workstation, video monitor, local data network, central office, or any other type of telecommunications apparatus. The signals injected by each user, which might already be highly aggregated, must each be delivered by the lightwave network to its intended destination. Each access station is responsible for converting the applied user signals into an optical format, placing these signals onto the medium, retrieving from the medium those signals intended for itself, and delivering these to the attached user.

The optical medium of FIG. 1 is capable of performing only linear optical operations such as signal combining and splitting, wavelength selective filtering, and linear amplification, and is totally devoid of logical functionality. Its sole responsibility is to deliver each wavelength-multiplexed signal ($\lambda_1$ through $\lambda_{10}$) injected by each access station to its intended receiver. All logical operations needed to create a telecommunications signal transport capability, such as routing and protocol processing, are performed by electronic circuitry in the access stations. The access stations, then, are also responsible for electronic processing of user signals prior to their placement onto the optical medium and subsequent to their retrieval from the optical medium. The medium, therefore, provides the optical channels which interconnect the access stations, and the access stations prepare user signals for transport over the medium.

In a certain functional sense, the lightwave network of FIG. 1 is no different from a conventional local area network (LAN). The LAN consists of a shared medium, along with access stations which transfer user signals among themselves over the shared medium. There are, however, two important distinctions. First, whereas the LAN medium typically involves a single high-speed channel which is shared by all access stations, the medium of the lightwave network involves a great number of wavelength multiplexed/wavelength re-used high-speed channels. Second, whereas the LAN serves a small population of users scattered throughout a small service domain (typically less than 1 km. in diameter), the lightwave network is potentially capable of creating the wide-area infrastructure needed to provide primary telecommunications services, to a vast user population.

The interest in lightwave networks arises from several observations and prospective opportunities. First is the enormous information-bearing capability of such a network. This capacity can be used to deliver advanced services to users or to enable execution of bandwidth-intensive applications. Part of its capacity might be allocated to the execution of a rich set of self-diagnostic routines, thereby improving network reliability as observed by the user. Yet another part of this capacity might be "squandered," in the sense of simplifying network management and control software at the expense of consuming greater capacity than would otherwise be needed to meet aggregate user demand. Second, such networks are both modular and "hardware scalable"; the network contains only the medium and the access stations, and larger networks can evolve from smaller networks by deploying more of the same types of equipment. Third, the network supports clear channel connections among the access stations, each of which can be used to carry information in an arbitrary transmission format. Moreover, it is possible to overlay a fast, packet switching capability on top of these clear channels, thereby enabling complete connectivity among the access stations at the virtual connection level, despite their limited connectivity at the optical channel level. Fourth, such a network is readily reconfigurable. Referring back to FIG. 1, we note that by re-assigning wavelengths differently among the access stations (1 through N), it becomes possible to alter the clear-channel optical connections among them, a property which is important when re-deploying resources in response to changing traffic patterns or reconfiguring in response to network equipment failure and recovery.

Interest in lightwave networks first developed in the mid-1980s. At that time, optical transmission systems were already firmly entrenched, and leading researchers began to seek new directions for applying optical device technologies. The enormous bandwidth prospects of single mode optical fiber soon presented an inviting target, and much device-level research was pursued, focusing on the production of multiwavelength technologies needed to create a suitable physical layer. Produced were wavelength multiplexing techniques, advances in semiconductor lasers, tunable optical filters, coherent optics technology, and more sensitive optical receivers. Also produced were techniques and subsystems for stabilizing the closely-spaced wavelengths generated by a comb of single frequency laser diodes. Work was also pursued in the area of electronically controlled optical waveguide switches based on Lithium Niobate technology. Work focused on the creation of rapidly tunable laser diodes was initiated, an effort that persists today. Efforts were also begun to develop optical amplifiers and electronically controlled wavelength-selective optical switches. These latter efforts have brought forth two technologies important to the subsequent development of lightwave networks: the Erbium Doped Fiber Amplifier and the Acousto-Optical Tunable Filter (AOTF).

Systems efforts during this early era were focused on a simple architecture: the broadcast and select network. A block diagram of such a network appears in FIG. 2. Here, each of access stations 1 through N is equipped with a single laser diode transmitter 200 capable of generating light at a unique wavelength, and with a single optical receiver 201 capable of being tuned to the wavelength of any one such transmitter. Signals produced by the transmitters are linearly superimposed in a centrally located optical star coupler 202, a passive device which broadcasts a scaled version of the superimposed signals back to each receiver. By selecting the appropriate wavelength, each receiver can accept the signal injected by the corresponding transmitter, thereby creating a clear channel from the transmitter to that receiver. In an alternative arrangement, each receiver accepts light at a fixed, predefined wavelength, and each transmitter is made wavelength-agile and capable of creating a channel to any receiver by tuning its wavelength to that accepted by the chosen receiver.

To be of use as a broadband multimedia network, it is necessary that the user connected to each access station of a broadcast and select network be capable of maintaining an independent dialogue with each of several other users. This is especially true if the signals injected by a generic optical network user are already the aggregate of signals generated by other, lower-speed users (e.g., one type of generic optical network user may be the gateway node of a LAN).

In a typical asynchronous transfer mode (ATM) network, the capability of providing independent communications is handled by converting each signal produced by a given user into a sequence of fixed-length ATM cells, with the destination for each cell being identified by the virtual connection number contained in that cell's header field. The cells produced by a given user corresponding to different virtual connections 1 through M (and, most likely, intended for different recipients) are statistically time-multiplexed by statistical multiplexer 300 prior to presentation to the network, as shown in FIG. 3. The network then reads each header of the resulting sequence of cells, and delivers each cell to its intended receiver. All forms of telecommunication traffic (voice, data, image, video) must first be converted to sequences of ATM cells. In such a fashion, each user can simultaneously maintain an independent dialogue with each of some multitude of other users.

To provide such a capability, each receiver (or transmitter) of the broadcast and select network must be capable of retuning to a new wavelength, once per each ATM slot time. A simple three input/three output example appears in FIG. 4, including transmitters 401, 402, and 403, and receivers 410, 411 and 412, with wavelength agility provided at the receivers 410, 411 and 412. Referring to the output at receiver 410, for example, we note that, in rapid sequence, it must retune from $\lambda_3$ to $\lambda_2$ and back to $\lambda_3$. Such rapid "packet switching" presents several major barriers. First is the difficulty of tuning, itself. Each receiver (or transmitter, if that is where the wavelength agility resides) of an N-station network must re-select the appropriate 1-out-of-N wavelengths very rapidly in the narrow guard time between ATM cells. By way of example, if the data rate of each optical channel is 1 Gigabit/sec., then the ATM cell, which contains 53 bytes, has a duration of 424 nsec.; allowing for some silent guard time between consecutive cells, a slot size of perhaps 500 nsec. results. Re-tuning must therefore be done once every 500 nsec., with the re-tuning transient completed within about 75 nsec., maximum, and the newly chosen wavelength must then remain stable for the subsequent 424 nsec. While this may be possible for small values of N (say, under 10), there remain the issues of both short- and long-term drift of the chosen wavelength. Second, referring to FIG. 4, it is necessary that the cells generated from the various access stations have time-aligned time slot boundaries, as they arrive at the star coupler 420, which further suggests that the star coupler be implemented as a single, centrally located element. If this is not done, then the receivers will necessarily miss portions of the arriving cells since only a single wavelength can be chosen at a time. Third, again referring to FIG. 4, it is apparent that careful coordination is required among the transmitters 401, 402 and 403, such that, for each time slot, each transmitter chooses a distinct receiver (if two transmitters were to choose the same receiver at the same time, then one of the transmitted cells would be lost since, again, a given receiver can choose only one wavelength at a time). Furthermore, by some mechanism, each receiver must be told, slot-by-slot, which wavelength to choose. Although many strategies have been proposed for such signaling means, few are useful if the network is large because of the large volume of signaling information involved (e.g., a hypothetical 8,192-station network would require a signaling rate of 8,192 stations at 13 address bits per station every 500 nsec.=213 Gigabits/sec.!). Although scheduled time division multiplexing can avoid the need for such signaling, this produces a rigidly defined bandwidth for each user-to-user connection, which may be inappropriate for multimedia networks integrating continuous bit rate and bursty variable bit rate traffic. Scheduling and transmission coordination can also be avoided if wavelength agility is implemented at the transmitter, but these are replaced by the likelihood that collisions will occur if two or more transmitters attempt simultaneously to transmit on the same wavelength to the same receiver (this is an ALOHA-like random access solution, and would also involve collision detection mechanisms, backoff/re-transmission strategies and, at best, 36% channel utilization efficiency). Finally, the number of usable wavelengths is limited by the sophistication of the wavelength multiplexing technology employed and the 5 terahertz passband of the EDFA which is required on each output port of star coupler 420 to offset optical power splitting and insertion losses. If adjacent optical carriers are separated by 1 nm. in wavelength, then the number of wavelengths and, hence, the number of access stations would be limited to approximately 100. Thus, we conclude from the above that the simple broadcast and select approach, which was the focus of lightwave network research at the dawn of the field, does not provide a suitable platform for a new, scalable, wide-area telecommunications infrastructure.

As the potential of lightwave networks became more apparent, telecommunication systems researchers became attracted to the field, joining the device researchers who had originally identified the opportunities and who had made solid advances at creating an arsenal of device and subsystems capabilities. A new concept, known as multihop, was soon suggested, which provided the basis for much ongoing systems-level research on lightwave networks. The multihop approach avoids many of the problems associated with the aforementioned broadcast and select approach. When combined with new devices capable of supporting wavelength re-use technologies, the systems-level concepts associated with multihop are readily extended to create a scalable hardware platform which may serve as the basis for a new wide-area infrastructure.

The multihop approach, illustrated in FIG. 5a for an eight-station system and a physical bus topology, provides a fast packet-switching service (which may, in fact, conform to ATM) while avoiding the need for rapid, cell-by-cell wavelength agility. For the example illustrated in FIG. 5a, each access station 501 through 508 is equipped with two fixed-wavelength transmitters and two fixed-wavelength receivers (not shown in FIG. 5a); no two transmitters share the same wavelength, and no two receivers share the same wavelength. Signals are injected onto the transmit bus 510 via directional couplers (not shown in FIG. 5a), and the superimposed signals, each distinguished by its unique wavelength, are broadcasted onto the receive bus 520.

By means of its two optical transmitters, each access station creates a different clear optical channel to each of only two other access stations. Thus, the access stations are not fully interconnected at the optical channel level, and a wavelength incompatibility problem arises if a given access station intends to send a cell to one of the stations to which it does not have a clear channel (an overwhelmingly likely situation if there are many access stations, each generating and terminating only two clear channels). Resolution of this wavelength incompatibility problem requires wavelength translation, a function easily accomplished in the electronic domain if we require that each access station, in addition to connecting a user to the network, also serves as a cooperating relay station for packets introduced by other stations. For example, if station 501 in FIG. 5a wishes to send an ATM cell to station 502, it might present this cell to the medium using $\lambda_1$; after propagating once past head-end 530, this cell will arrive at station 505, having the only receiver listening to $\lambda_1$. Using its electronic circuitry, station 505 recognizes that this cell is intended for station 502, and (again in electronics) routes this cell to its transmitter which operates at $\lambda_{10}$. After a second pass over the medium on $\lambda_{10}$ (hence, the name "multihop"), the cell arrives at station 502. Note that the wavelength incompatibility problem was solved without requiring direct optical-to-optical wavelength translation but, rather, involved an interim conversion of the ATM cell to electronics within access station 505. The cell was then processed by a small 3×3 electronic ATM switch (one user input, two inputs from the optical medium; one user output, two outputs back onto the optical medium). Contention which may arise if multiple cells should concurrently arrive at an access station, all bound for a common output from that station, is resolved by means of store-and-forward smoothing buffers residing in the ATM switch where contending cells are temporarily stored and delivered sequentially to the output.

For the example presented in FIG. 5a, it can be shown that the assignment of wavelengths among the access stations allows any station to reach any other station in, at most, three hops. The actual wavelength assignment, showing the originating and terminating station of each wavelength, appears in FIG. 5b in the form of a so-called optical connectivity diagram. For the example given, this connectivity diagram takes the form of a recirculating perfect shuffle in which the stations are arranged in two columns, each containing four stations. The transmitters (not shown in FIG. 5b) of column 1 stations 551, 552, 553 and 554 are connected to the receivers (not shown in FIG. 5b) of column 2 stations 561, 562, 563 and 564, and the transmitters (not shown in FIG. 5a) of column 2 stations 561, 552, 553 and 554 are connected to the receivers (not shown in FIG. 5a) of column 1 stations 551, 552, 553 and 554. Using the optical connectivity diagram, it is possible for the network admission controller (not shown) to choose a path (a sequence of optical links) for a newly requested virtual connection originating at any given station and terminating at any other. As with a conventional ATM network, a multiplicity of virtual connections may be multiplexed onto each link and, at call admission time, the admission controller determines whether the inclusion of the traffic presented by the newly requested connection will unacceptably degrade the quality-of-service enjoyed by other virtual connections sharing any common link with the newly requested connection. If so, the new connection request is denied; if not, the new connection is admitted and the routing tables in the ATM switches encountered along the chosen path are provided with the appropriate instructions. The difference here is that, for the lightwave network, each link corresponds to a different wavelength, with all such wavelengths multiplexed onto a common physical medium, whereas for a conventional network, each link corresponds to a unique point-to-point transmission system with its own dedicated optical fiber medium.

While not recommended for a scalable wide-area telecommunication infrastructure, the recirculating perfect shuffle connectivity diagram of FIG. 5b is well-suited to uniform traffic patterns—i.e., those having a common traffic intensity between each pair of users. One of the problems associated with the recirculating perfect shuffle diagram is that it is not modular but, rather, the number of access stations must obey the relationship $$N=kp^k, \tag{1}$$

where p is the number of optical transceivers per access station (p=2 for FIG. 5) and k is the number of columns in the connectivity diagram, each containing $p^k$ stations. A shufflenet is a multihop network using a recirculating perfect shuffle connectivity diagram having a number of access stations characterized by Formula (1). An N station shufflenet requires a total of Np optical links. For such a network, it can be shown that under conditions of uniform traffic loading that the aggregate network capacity, defined as the maximum exogenous load which can be accepted such that the total load (new traffic plus relay traffic) on each link is equal to the link capacity, is given by:

$$C_T = \frac{2S(p-1)kp^{2k+1}}{(p-1)(3k-1)p^k + 2p(1-p^{k-1})} \quad (2)$$

where S is the capacity of each optical link. Formula (2) is gotten by dividing the sum total capacity of all optical links (N×p×S) by the expected number of hops taken by a representative packet. The expected number of hops is approximately $\log_p N$ when N is large. By dividing $C_T$ by N, we can compute the maximum traffic load which can be offered by each access station.

Note that the connectivity diagram of FIG. 5b bears no resemblance to the physical topology of FIG. 5a. Note also that, since each optical channel is a separate entity having a single transmitter and a single receiver, there is no need to maintain time slot synchronization as was the case with broadcast and select networks.

Corollaries of these observations include first, that any physical topology which broadcasts the combined optical signals can serve as the basis for a multihop network. For example, the star topology of FIG. 4 can be used. Second, any optical connectivity diagram can be produced, subject only to the constraints that each station can generate and terminate only p optical channels. Third, a multihop network need not be based on a recirculating perfect shuffle connectivity diagram. Any reasonable connectivity diagram will do. In fact, under conditions of non-uniform traffic, a connectivity diagram which creates clear channels between the stations-pairs presenting the greatest traffic intensities will always outperform a recirculating perfect shuffle diagram. Fourth, the number of stations in a multihop network is not bound by Formula (1), since any reasonable connectivity diagram will suffice; Formula (2) presents a constraint only on shufflenets, but not on multihop. Fifth, if the transmitters or receivers of the multihop network access stations can be tuned to different wavelengths, then it becomes possible to alter the connectivity diagram, while leaving the physical topology unchanged. For example, see J. F. Labourdette and A. S. Acampora, "Logically Rearrangeable Multihop Lightwave Networks," IEEE Trans. Comm. Vol. COM-39, August 1991. Note that rapid agility is not needed here. This allows the connectivity diagram to be updated whenever traffic patterns change and whenever a new access station is added to the network. A multihop network with tunable transmitters or receivers is therefore modular. Furthermore, just as the connectivity diagram can be changed to admit a new access station, it can also be changed to bypass a failed access station. Sixth, unlike the broadcast and select network which required rapid wavelength agility, the reconfigurability property of the multihop network can be capitalized with greatly relaxed requirements on tuning speed. Here, tuning is not involved on a packet-by-packet basis but, rather, only when a change of connectivity diagram is desired. In general, slow tuning over a broad optical window is much more feasible. Seventh, in essence, slow tuning provides a circuit switching feature whereby an appropriate connectivity diagram is produced. Then, multihop provides the required packet-by-packet wavelength translation needed to provide full connectivity at the virtual circuit level, despite decidedly limited station-to-station connectivity at the optical channel level.

One major problem yet remains: the number of wavelengths which can be multiplexed onto a common physical medium is limited, as before, to the number which can be placed in the passband of the EDFA. However, wavelength re-use can be invoked to overcome this limitation, and electronically controlled wavelength-selective routing can eliminate the need for any transceiver wavelength agility, while still preserving the reconfigurability properties of multihop networks.

The production of a multihop connectivity diagram for a large network requires a large number of optical clear channels (p×N for an N-station network, each with a fanout of p). These channels need not be wavelength multiplexed onto a common medium; it is possible to create a multihop network by means of re-using a common set of wavelengths on multiple media.

A possible approach is shown in FIG. 6. Here, wavelengths $\lambda_1$–$\lambda_8$, used by access stations 601, 602, 605, and 606 on Transmit Bus 610, are also used by stations 603, 604, 607, and 608 on Transmit Bus 620. By means of passive wavelength demultiplexers and re-multiplexers 651, 652, 653 and 654, wavelengths $\lambda_1$, $\lambda_2$, $\lambda_5$, and $\lambda_6$ from Transmit Bus 610 are combined with wavelengths $\lambda_3$, $\lambda_4$, $\lambda_7$, and $\lambda_8$ from Transmit Bus 620 and are injected onto Receive Bus 630. Similarly, wavelengths $\lambda_3$, $\lambda_4$, $\lambda_7$, and $\lambda_8$ from Transmit Bus 610 are combined with wavelengths $\lambda_1$, $\lambda_2$, $\lambda_5$, and $\lambda_6$ from Transmit Bus 620 and are injected onto Receive Bus 640. The connectivity diagram of FIG. 7 results. Note that, although the physical topologies of the networks of FIGS. 5a and 6 are different, functionally identical optical connection diagrams have been produced. An advantage of the network of FIG. 6 is that only eight wavelengths are used. However, a disadvantage of the network of FIG. 6 is that the reconfigurability of the optical connection diagram is limited because the path of each wavelength between the demultiplexers and multiplexers is "hard wired"; for example, it is not possible to inject wavelength $\lambda_1$ from Transmit Bus A onto Receive Bus B. For small networks, this lack of reconfigurability can be partially offset by exploiting slow tuning; since it is not possible for wavelengths $\lambda_1$ and $\lambda_2$ generated by Station A to be received at any of stations 3, 4, 7, or 8, it may be possible to retune Stations A's transmitters to allow such a connection, if needed (any one among wavelengths $\lambda_3$, $\lambda_4$ $\lambda_7$, or $\lambda_8$ would suffice). The other transmitters attached to Transmit Bus A would then be appropriately re-tuned.

A better way to maintain a high degree of reconfigurability while allowing a limited number of wavelengths to be re-used on different media is by means of wavelength-selective, electronically controlled optical switches such as those described in D.A. Smith, et al. "Integrated Optic Acoustically Tunable Filters WDM Networks," IEEE J. Sel. Areas Comm., Vol. 8, August 1990. A functional representation for such a 2×2 switch appears in FIG. 8. Here, two wavelength-multiplexed signals arrive on each of the two input fibers 801 and 802 and, under electronic control, the switch 800 has been instructed to combine $\lambda_1^A$, arriving on input 810 with $\lambda_2^B$, arriving input 820, and to deliver the combined signal to Output 830. Similarly, $\lambda_2^A$ has been combined with $\lambda_1^B$ and delivered to Output 840. For each of the wavelengths appearing on its two inputs, the switch 800 can be independently configured in the "bar" state (upper input connected to upper output, lower input to lower output), or in the "cross" state (upper input to lower output, lower input to upper output). Since the switch changes state under electronic control, only linear operations are performed on the optical signals (wavelength filtering and routing). Such a switch is therefore an admissible element of the "passive" optical medium.

Switches such as those just described can be fabricated by means of Acousto-Optic-Tunable-Filter (AOTF) technology, and 2×2 switches can be cascaded to create M×M switches (state-of-the-art technology currently limits AOTF switching matrices to, approximately, 8×8, and can independently route, approximately, 8 wavelengths). Note that the switching transient for such switches can be made small (on the order of microseconds).

The use of AOTF switches allows a very limited number of distinct wavelengths to be reused an arbitrarily large number of times, while maintaining a high degree of reconfigurability among the access stations. A high-level block diagram of a new, lightwave network-based, wide-area telecommunications infrastructure might then appear as shown in FIG. 9. A total of p wavelengths are used, and each access station 1 through N is equipped with p optical transceivers (not shown), one for each wavelength. The access stations connect to the optical medium 901 through M×M AOTF switches 910. All inputs/outputs of all switches contain all p wavelengths, and the switches are interconnected among themselves by means of single mode optical fiber, thereby creating a reconfigurable, wavelength-routed optical medium.

The network architecture presently being considered by those in the telecommunications field for a new, scalable, broadband telecommunications infrastructure is based on (1) the use of wavelength division multiplexing (WDM), (2) the use of wavelength to route each signal to its intended destination in the network (Wavelength Routing), (3) the translation of signals from one wavelength to another at the access stations (Wavelength Translation), and (4) the use of multihop packet switching. These four principles permit networks to be built whose size is essentially unlimited and independent of the number of wavelengths available.

The network consists of (1) an all-optical inner portion which contains the wavelength routing crossconnection elements, (2) user access stations which attach to the optical medium, and (3) a distributed network controller resident in the access stations.

It is instructive to represent the proposed infrastructure by the layered diagram of FIG. 10, with each layer providing a "service" to the one above it such that desired user-to-user connections can be made "on demand." At the lowest layer 1000 is the physical deployment of the medium 1001: the actual layout of the fibers, the routes over which population centers are interconnected by fiber bundles, the location of the AOTF switches, the access stations, and the connection of generic "users" to their access stations. We will not be further concerned with this level, except to say that topologies for the higher functional layers of the network are independent of the layout of the "trenches" in which the physical apparatus is installed.

The next layer corresponds to the fiber interconnection graph 1010. This layer defines how the optical fibers 1011 should interconnect the optical switches (not shown). Any desired fiber interconnection graph can be realized within the trench topology by conceptually stretching and distorting the fibers and the graph so that they fit within the trenches. At this layer, we see the users, their access stations, and the wavelength-selective optical switches, but not the trenches themselves. The graph can be matched to geographical traffic density and should not unnecessarily block desired access station-to-access station optical connections.

The next layer shows the optical connectivity graph 1020, corresponding to the optical channel connections 1021 which exist among the user access stations 1 through N (e.g., an optical channel using wavelength $\lambda_1$ originating at station i, is routed through a series of AOTFs and terminates at station j, corresponding to a directed optical channel connection from i to j). At this layer we see the users and their access stations 1 through N, but not the trenches and optical switches; the optical connection graph shows how the access stations are connected by "clear channels."

Whereas the first two layers are not reconfigurable, the wavelength-selective optical switches provide the means to change the access station connectivity diagram. The connection pattern at this plane can be rearranged by altering the states of the AOTFs in response to significant traffic demand changes. Each optical connection is realized by assigning transmitters and receivers from the access stations and communication capacity from the fiber connection layer. Connectivity at this level, however, is limited, in that no more than p directed optical connections can simultaneously originate from or terminate at any access station. The optical connectivity layer is designed to satisfy a set of user traffic requirements (in the form of estimated throughput and desired quality-of-service) and to respond to traffic pattern changes or equipment failure/recovery.

As indicated above, the optical connectivity among the access stations is incomplete, due to the limited number of transmitters and receivers per access station. Most user-to-user connections must go through several optical channels to reach their destinations. The virtual layer 1030 represents the arrangement of virtual connections 1031 among the actual users and, here, each user could, in principle, have a virtual connection to every other user attached to the network. At this layer, we see only the users; the access stations, optical switches, and trenches are invisible and provide only the underlying support for user-to-user connections. Information carried by a particular virtual connection travels along a sequence of optical channels, with full connectivity provided by using intermediate access stations as cooperating relay stations. Virtual connections are created and torn down by the network in response to instantaneous user-to-user calling patterns. For example, if the lightwave network is used to support ATM, then the access stations would contain ATM switches. Virtual paths between pairs of end points would be set up as end-to-end paths through a series of ATM switches, traversing several optical channels—that is, they would be set up as "multihop" connections. The job of the admission controller is to find, in response to a call request, a virtual path (set of optical links from sender to receiver) capable of handling that call. If such a path cannot be found, the call would be blocked. At each step along the way, the call processor must check whether or not the traffic intensity corresponding to the new call request can be accommodated without unacceptably degrading the Quality of Service enjoyed by other existing connections.

Assuming that each generic user attaches through its own dedicated access station, and that each access station attaches to the medium through its own dedicated wavelength-selective switch, an "access module" 1100 may appear as shown in FIG. 11. A total of p wavelengths are re-used throughout the network, and each access station 1101 is equipped with p transceivers, one for each wavelength. Each access station also contains a processor which is used for network management and control. Each wavelength-selective switch 1100 contains M+1 input/output fiber ports (one port connects the access station; each of the remaining M ports connects to another switch). All P wavelengths exist on all fibers. In total, the network interconnects N users through N access stations and requires N switches. To add a new user 1102, one additional switch 1103 is needed, along with one additional access station 1101. Physically, the switch is added by (wisely) choosing M fibers from the existing plant, severing each fiber so chosen, and connecting the several ends of each fiber to one I/O port of the switch. Some of the optical channels generated by a given access station may be used in the "clear channel" mode and are routed through the switches to their intended receiving access stations. Others are used to create the multihop network and are routed to their intended access station receivers as defined by the multihop optical connectivity graph.

This model is scalable and modular in the hardware sense: large networks evolve from smaller ones by introducing additional copies of the generic access module; the number of modules is directly proportional to the user population, and the network can grow in size without bound (in both number of users and geographical span of coverage). However, we see that the underlying fiber connection graph is not rearrangeably non-blocking, in that an arbitrarily chosen optical connectivity graph may not be realizable. To insure that any arbitrary optical connectivity graph can be supported, the fiber graph would require, at least, on the order of N log N switches; since the actual number of switches is limited to N (by the scalability requirement), not all possible optical connectivity graphs can be supported. However, since each access station enjoys a full complement of P transceivers, this restriction may not be encountered until N grows quite large. In any event, this restriction may eventually cause some clear-channel blocking or preclude the realization of some desired multihop connection graph.

Therefore, it would be desirable to have a telecommunications network which is scalable and modular in both the hardware and software sense.

SUMMARY OF THE INVENTION

An object of the present invention is to provide a network architecture for local area, wide area, and national scale telecommunications networks, and techniques for formulating such networks.

A further object of the present invention is to provide a modular telecommunications network.

A further object of the present invention is to provide an expandable telecommunications network that can handle an arbitrarily large number of users.

A still further object of the present invention is to provide a method for efficiently routing information in such a network.

A still further object of the present invention is to provide a network that is not only hardware scalable, but also software scalable.

In order to meet these and other objects which will become apparent with reference to further disclosure set forth below, the present invention provides a technique for making a recursive mesh network for connecting a varying number of access stations within a service area, including the steps of (a) dividing the service area into M×N regions, having (M+1)×(N+1) corners, which cover the entire range of the service area, where each side of each region corresponds to a communication channel; (b) placing an access station at an available region corner whenever a new access station becomes available, and connecting the access station to its corresponding connection paths, until (M+1)×(N+1) access stations have been so connected; (c) determining, for each additional new access station, within which region the additional new access station falls; (d) if this determined region has not been divided, dividing the determined region into M'×N' sub-regions; (e) if the divided determined region has less than (M'+1)×(N'+1) access stations within it, placing the additional new access station at an available sub-region corner in the region and connecting the new additional access station to at least one other access station within the same region; and (f) if the divided determined region has (M'+1)×(N'+1) access stations within it, repeating steps (c) through (f) with respect to that sub-region until the new additional access station can be connected.

In a preferred embodiment, additional extraplanar connections are added to the recursive mesh network. The technique is also preferably applied to assign optical channels over an optical medium or to assign virtual channels over a fiber mesh.

The present invention also provides an apparatus for providing a recursive mesh network for connecting a plurality number of access stations within a service area by connecting links, including first dividing means for dividing the service area into M×N regions, having (M+1)×(N+1) corners, M and N being integers $\geq 2$, where each side of each region corresponds to a bidirectional connection link; first assignment means, coupled to the first dividing means, for assigning a new access station at an unoccupied region corner and connecting the new access station to corresponding connection links, until (M+1)×(N+1) access stations have been connected; locator means, coupled to the first assignment means, for determining, after all (M +1)×(N +1) region corner have been occupied, for each additional new access station, which of the regions said additional new access station falls within; second dividing means, coupled to the locator means, for dividing the determined region into M'×N' sub-regions having (M'+1)×(N'+1) sub-region corners, M' and N') being inters $\geq 2$, when the determined region has not been divided; second assignment means, coupled to the second dividing means, for assigning the additional new access station at an available corner of the sub-region and connecting the new additional access station to bidirectional connection links that lead to at least one other access station within the same sub-region, when the divided determined sub-region has less than (M'+1)×(N'+1) access stations within it; and repeat means, coupled to the locator, second dividing and second assignment means, for causing the locator, second dividing and second assignment means to act with respect to that sub-region until the new additional access station is connected when the divided determined sub-region has (M'+1)×(N'+1) access stations therewithin.

The present invention also provides a telecommunications network connecting a plurality of users within a service area by a recursive mesh network, including a plurality of access stations, each access station being capable of being accessed by at least one user; and a plurality of connection links for connecting each of the access stations to at least one other access station to form a recursive mesh network. Preferably, the telecommunications network further includes one or more extraplanar links, wherein each extraplanar link connects a preselected access station within the recursive mesh network to a different preselected access station within the recursive mesh network.

Further, the present invention provides methods for using the recursive mesh network including a plurality of access stations within a service area to connect a first access station to a second access station. The methods are preferably used to route information through real or virtual channels in an optical mesh or to route information through clear channels in a fiber mesh in order to route information between access stations.

Further to the preferred embodiment, information is routed in a recursive mesh network to connect a first access station A at location $(x_A, y_A)$ to a second access station B at location $(x_B, y_B)$, where each access station within said network stores information sufficient to reach all other access stations no more than a preselected number of hops away in a local table T, each access station at a head-end stores the shortest path to every other access station within that head-end region in a local table H, and each access station within an incomplete grid stores the shortest path to the nearest head-end in a local table H.

This method includes the steps of using the local routing table H of access station A to reach access station B from access station A if the table H contains the address of B; if not, then routing along the x connection paths of the network east or west until $x=x_B$ or until the x connection paths are blocked at access station C; routing from access station C to access station B, if the x connection paths are blocked, by: (i) using the local routing table H of access station C to reach an access station C' at the head-end of C; (ii) routing along the x connection paths and the y connection paths of said network from access station C' to access station B', wherein access station B' lies at the head-end of B; and (iii) using the local routing table H of access station B' to reach access station B; routing along the y connection paths of said network north or south until $y=y_B$ or until said y connection paths are blocked at access station D; and routing from access station D to access station B, if said y connection paths are blocked, by (i) using the local routing table H of access station D to reach an access station D' at the head-end of D; (ii) routing along the x connection paths and the y connection paths of said network from access station D' to access station B', wherein access station B' lies at the head-end of B; and (iii) using the local routing table H of access station B' to reach access station B.

In a second preferred method, information is routed in a recursive mesh network to connect a first access station A at location $(x_A, y_A)$ to a second access station B at location $(x_B, y_B)$, wherein each access station within the network stores information sufficient to reach all other access stations no more than a preselected number of hops away in a local table T, and D(S,T) is defined as being equal to the sum of the absolute value of $(x_S-x_T)$ and the absolute value of $(Y_S-Y_T)$.

This method includes the steps of starting at access station A; routing from the present access station P to a new access station X if P and X share a connection path and D(X,B)<D (P,B); when P and X are do not share a connection path or D(X,B)<D (P,B), (i) routing from the present access station P to the access station L at the left of said access station P; (ii) routing to the access station R at the right of said access station L; and (iii) repeating step (c)(ii) until D(R,B)<D(Q, B) for all Q ∈N, wherein N is the set of all access stations visited during such routing; and repeating the foregoing steps until access station B is connected.

The present invention also provides an apparatus for routing information in a recursive mesh network to connect a first access station A at location $(x_A, y_A)$ to a second access station B at location $(x_B, y_B)$, wherein each access station within the network stores data sufficient to route said information to all other access stations no more than a preselected number of hops away in a local table T, each access station at a head-end stores the shortest path to every other access station within that head-end region in a local table H, and each access station within an incomplete grid stores the shortest path to the nearest head-end in a local table H, including first memory means for using the local routing table T of access station A to reach access station B from access station A if said table T contains the address of B; first routing means, coupled to said first memory means, for routing along the connection paths of the network using local tables T in such a way that the distance to the access station B is reduced at each intermediate node if such routing is possible; if said table T of access station A does not contain the address of B; second routing means, coupled to the first routing means, for routing from access station C to access station B if the first routing means is not able to route due to blocking at node C, including: (i) second memory means, coupled to the second routing means, for using the local routing table H of access station C to reach an access station C' at the head-end of C; (ii) third routing means, coupled to the second routing means, for routing along the x connection paths and the y connection paths of said network from access station C' to access station B' in such a way that the distance to said access station B' is reduced at each intermediate node, wherein access station B' lies at the head-end of B; and (iii) third memory means, coupled to the second routing means, for using the local routing table H of access station B' to reach access station B.

Further, the present invention provides an apparatus for routing information in a recursive mesh network to connect a first access station A at location $(x_A, y_A)$ to a second access station B at location $(x_B, y_B)$, wherein each access station within the network stores data sufficient to route said information to all other access stations no more than a preselected number of hops away in a local table T, and D(A,B) is defined as the distance between said access station A and said access station B, including initiation means for starting at access station A; first routing means, coupled to the initiation means, for routing from the present access station P to a new access station X if P and X share a connection path and D(X,B)<D (P,B); and second routing means, coupled to the initiation means, to route information when P and X are do not share a connection path or D(X,B)>D (P,B). The second routing means includes (i) left routing means, coupled to the second routing means, for routing from said present access station P to the access station L at the left of said access station P; (ii) right routing means, coupled to the second routing means, for repeatedly routing to the access station R at the right of the present access station until D(R,B)<D(Q,B) for all Q ∈N, wherein N is the set of all access stations visited during such routing; and repeat means, coupled to the first and second routing means, for causing said first and second routing means to rout said information until said station B is connected.

The recursive grid network with extraplanar connections, in accordance with the present invention, has several advantageous features allowing modular scalable networks to be constructed. This combination of features is not available in any other prior art network architecture. First, the network allows routing to be performed in the network with bounded size routing tables at every node, independent of network size. Second, the network can be used to create networks connecting an arbitrarily large number of users using one bounded capacity access station per user. Third, the network is modular; switches can be added to the network in increments of unity. When a new switch is added, at most one existing network link must be severed, and only a bounded number of new links need be added to the network. Fourth, the network maps well to geographically distributed switches. Fifth, the network can always support a recursive grid at the optical connection graph layer, thereby extending the applicability of the scalable routing algorithm to the establishment of, e.g., ATM virtual paths.

The accompanying drawings, which are incorporated and constitute part of this disclosure, illustrate a preferred embodiment of the invention and serve to explain the principals of the invention.

BRIEF DESCRIPTION OF THE DRAWINGS

Throughout the figures, the same reference numerals and characters, unless otherwise stated, are used to denote like features, elements, components or portions of the illustrated embodiment.

DESCRIPTION OF THE PREFERRED EMBODIMENTS

Figure 12:
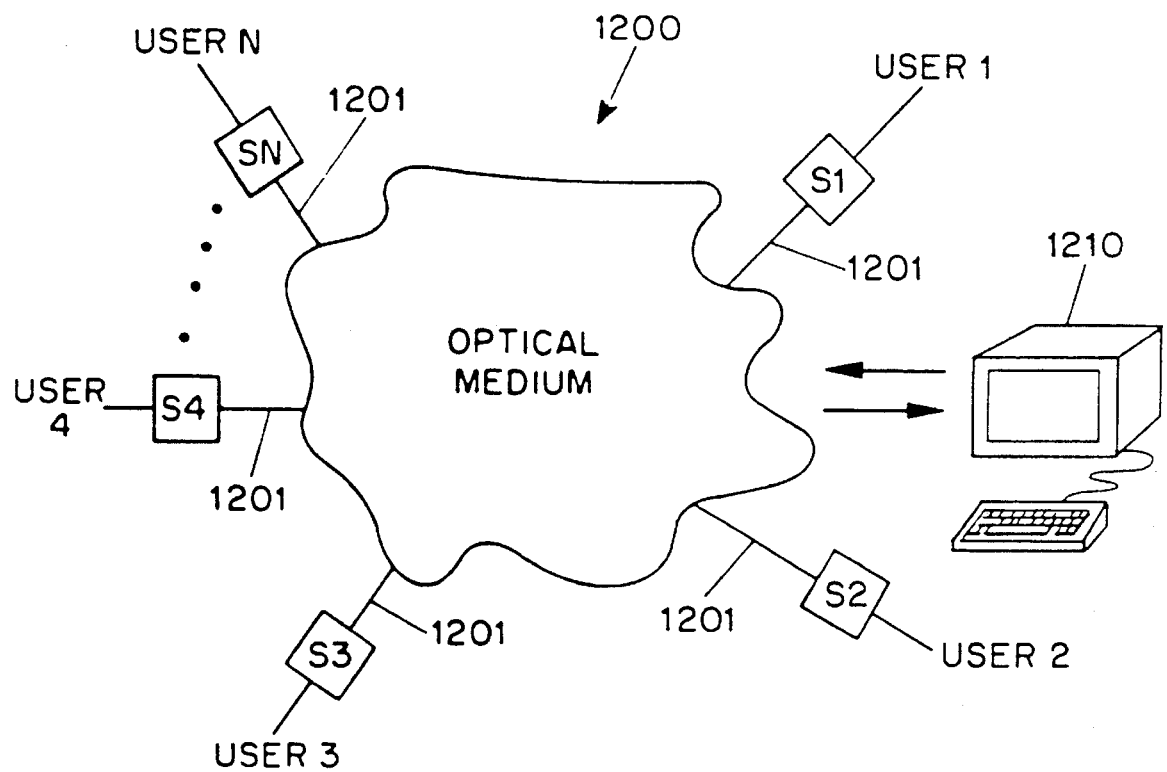
FIG. 12 is a descriptive diagram of a recursive mesh network according to the present invention.
Figure 13:
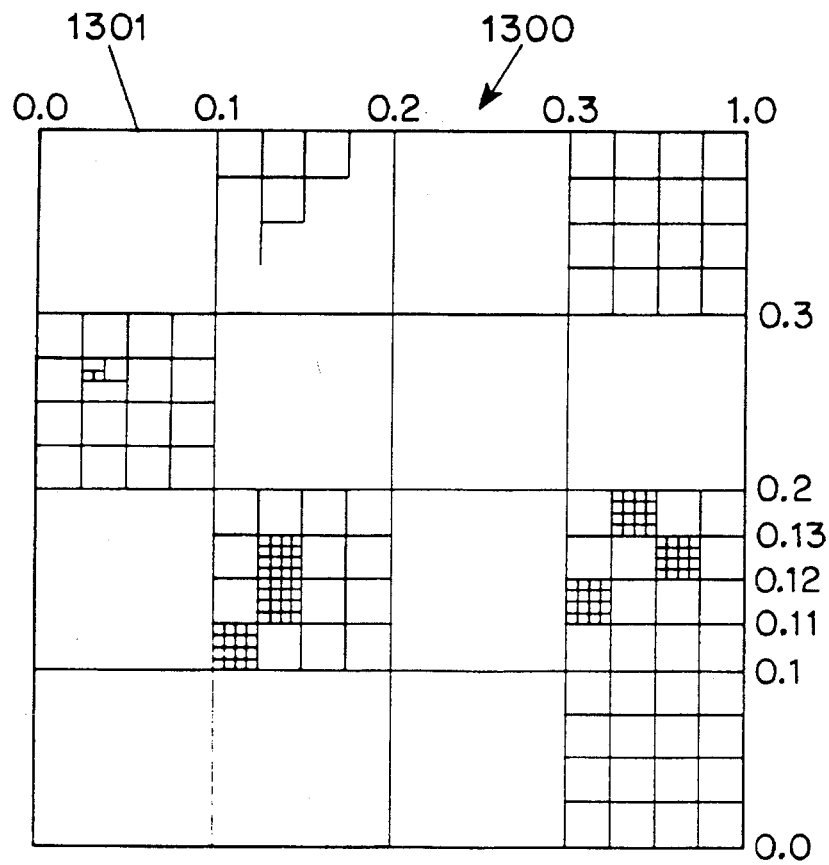
FIG. 13 is a descriptive diagram of a recursive grid according to the invention.
Figure 14:
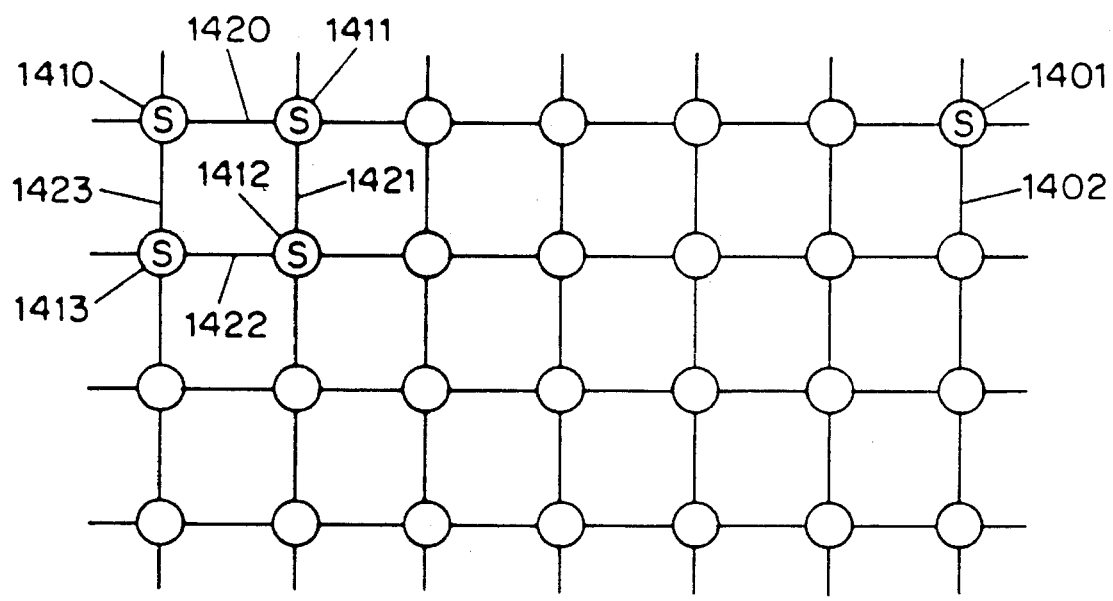
FIG. 14 is a descriptive diagram showing a complete grid according to the invention.

FIG. 12 illustrates a recursive grid network 1200 embodying the principals of the invention, and includes a set of access stations 1 through N interconnected by fiber links 1201 such that some subset of the links form a "recursive grid" among all access stations. FIG. 13 illustrates a typical recursive grid 1300, including links 1301. The links used to form the recursive grid must be bidirectional (one fiber in each direction). In order to further appreciate the invention, the following network arrangements are defined:

(1) A "complete grid" is any M×N (M≧2, N≧2, M and N are integers) set of access stations 1401 arranged in M rows and N columns where each access station is connected by a bidirectional link 1402 to adjacent access stations to form a grid. A complete grid is shown in FIG. 14.

(2) A "square" is any set of four access stations A, B, C, and D and four bidirectional links a, b, c, and d such that link a connects A and B, b connects B and C, c connects C and D, and d connects D and A. Such a square is referred to a square(A, B, C, D). For example, in FIG. 14, a square would include access stations 1410, 1411, 1412 and 1413 with links 1420, 1421, 1422 and 1423.

Figure 15:
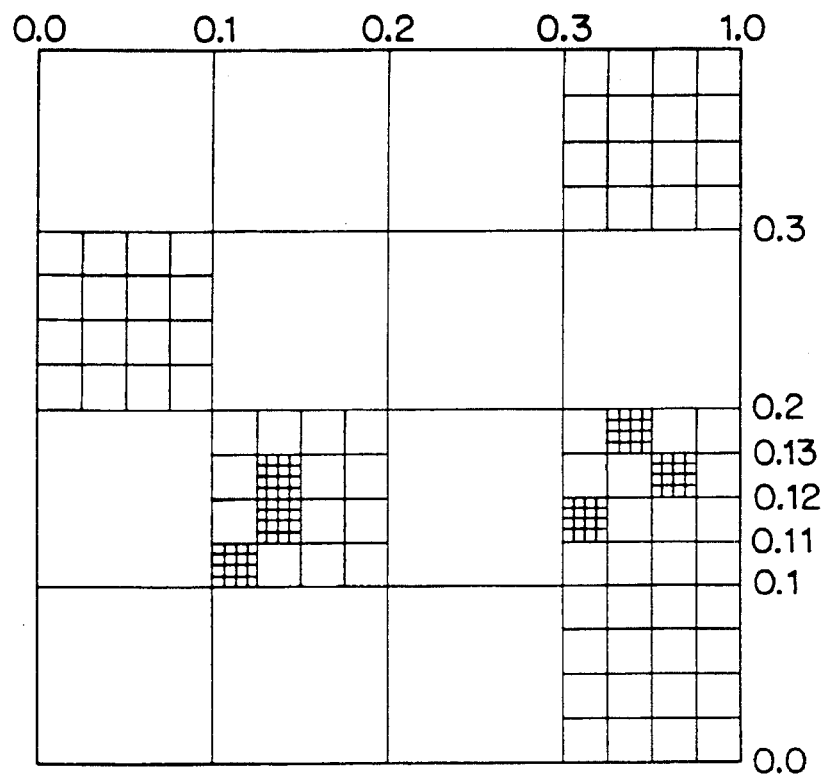
FIG. 15 is a descriptive diagram showing a complete recursive grid according to the invention.

(3) A "complete recursive grid" is any complete grid or any network that can be constructed by removing some number of squares from a complete recursive grid and replacing them with complete grids of any dimension. A 4×4 complete recursive grid is shown in FIG. 15.

(4) An "incomplete grid" is a complete grid from which 0 or more non-corner access stations and 1 or more non-edge links have been removed such that the network is still connected (i.e.: there exists a path over the remaining links connecting every pair of remaining access stations).

(5) An "incomplete recursive grid" is any network that can be constructed by removing some number of squares from a complete recursive grid and replacing them with incomplete grids of any dimension. A 4×4 incomplete recursive grid is shown in FIG. 13.

Scalability

We shall first address the issue of software scalability from the top down by starting with the procedure for establishing a new user-to-user virtual connection. Referring again to FIG. 12, if the optical connection graph be fixed, an admission controller, e.g., computer 1210, must seek to find a path from sender-to-receiver (that is, a sequence of optical channels from originating access station to terminating access station involving some number of intermediate multihop access stations) such that, if the new connection is admitted, then the quality-of-service ("QOS") enjoyed by each existing connection sharing at least one common optical link is not unacceptably degraded. If no such path can be found, then the new request must be blocked.

In general, the number of operations which must be undertaken by the admission controller to optimally decide on the admissibility of each call scales nonlinearly with the size of the network. This is problematic, for as the number of users grows, the rate at which new connection requests are made grows in direct proportion, along with the available processing power represented by the linearly increasing number of access stations (processing power cannot grow faster than linearly with N without violating the scalability requirement). However, the computational burden per processor is not a constant but, rather, increases with network size. Thus, to maintain a scalable architecture, some compromise is again needed.

The admission decision itself can be decomposed into two functions: path selection and QOS provisioning. We shall deal with path selection first. For any optical connection graph, a routing table at each access station can be devised. For some specified destination station, the routing table within each access station identifies the output optical channel from that station which should be chosen such that the connection is routed along some predefined path. Such "destination routing" allows each newly requested virtual connection to be self-routing: on the basis of destination, the originating station chooses an outbound link; when the request arrives at the first intervening multihop access station, that station consults its routing table to choose its outbound link, and so forth, until a sequence of links between sender and receiver is produced. At each step, QOS can then be ascertained by the corresponding access station. If QOS cannot be maintained on one of the links, then some strategy for considering some alterative link might be implemented. Unfortunately, such "destination routing" for an arbitrary optical connectivity graph, such "table lookup" destination routing is nonscalable, in that the number of routing table entries required at each access station increases linearly with network size; when the network has grown to a size which saturates the available routing table memory, further growth is stunted.

Figure 16:
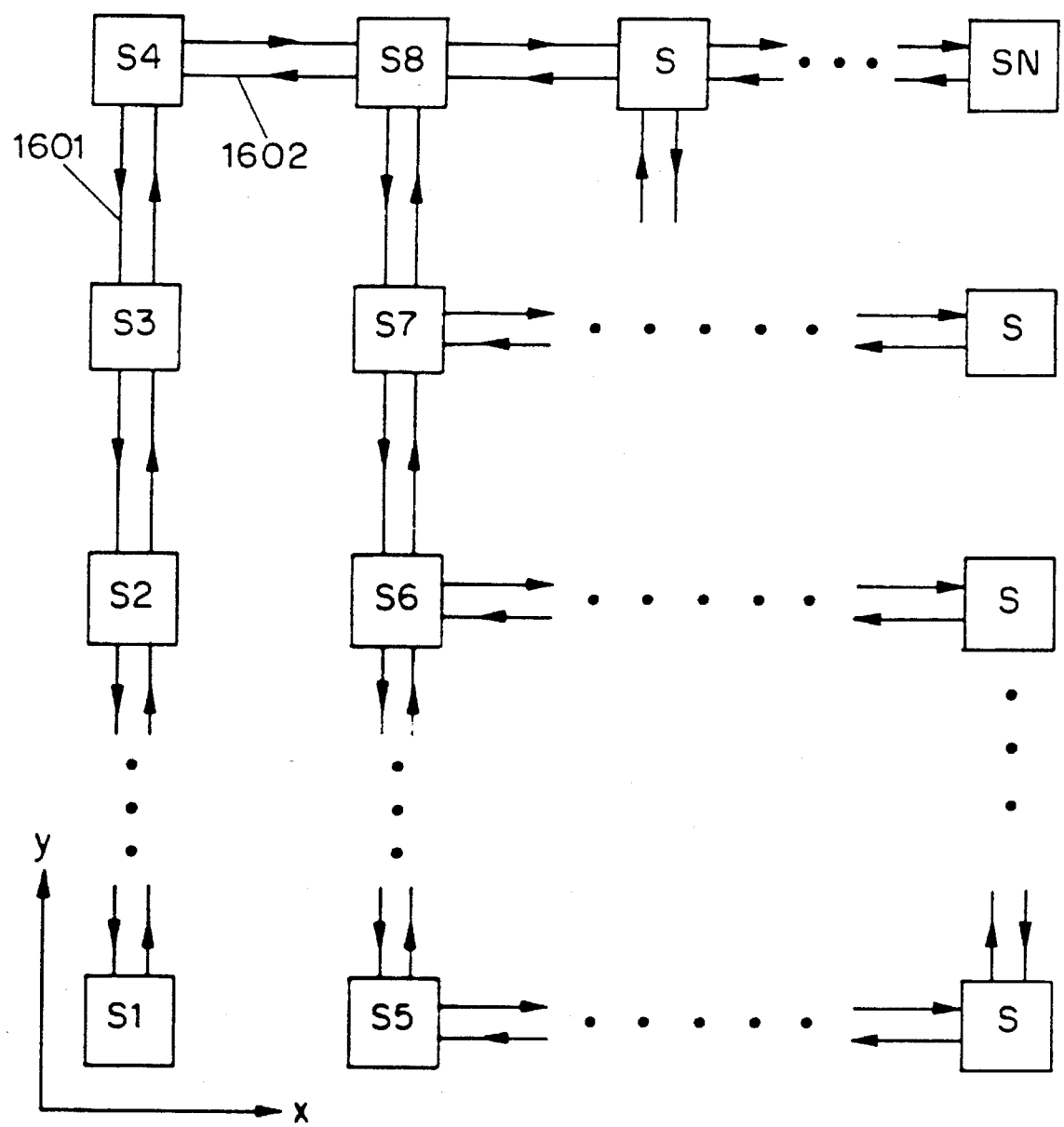
FIG. 16 is a descriptive diagram showing a rectangular modular grid regular graph according to the invention.

FIG. 16 shows an example of a regular optical connectivity graph which can be used to avoid this size restriction. By regular, we mean a connectivity graph whose pattern can be used to enable destination routing in such a way that the number of entries per routing table is independent of network size. In FIG. 16, the location of each access station 1 through N is defined by its Cartesian coordinates (x, y), and each access station uses four wavelengths (north, south, east, west). For example, the location of access station 1 is (0,0). To route to a given destination, an access station computes the Euclidean distance between each of its four neighbors and the intended destination, and routes to that neighbor which is closest to the destination (in the event of a tie, either can be chosen). Thus, independent of the network size, a fixed number of operations are required of the processor contained within each access station. For the sake of simplicity, no alternate routing would be permitted, that is, if any of the chosen links cannot provide adequate QOS, the new connection request would be blocked.

Such a rectangular grid optical connectivity graph can always be provided by the underlying fiber connectivity graph, provided that the fiber graph coincides with the rectangular pattern appearing in FIG. 16. If a wavelength-selective switch occupies the position of each access station 1 through N and an optical fiber occupies the position of each north-south optical channel 1601 and east-west optical channel 1602, then the required fiber graph will have been produced. The number of I/O ports required for each switch is therefore equal to 5 (north, south, east, west, access station).

Figure 17:
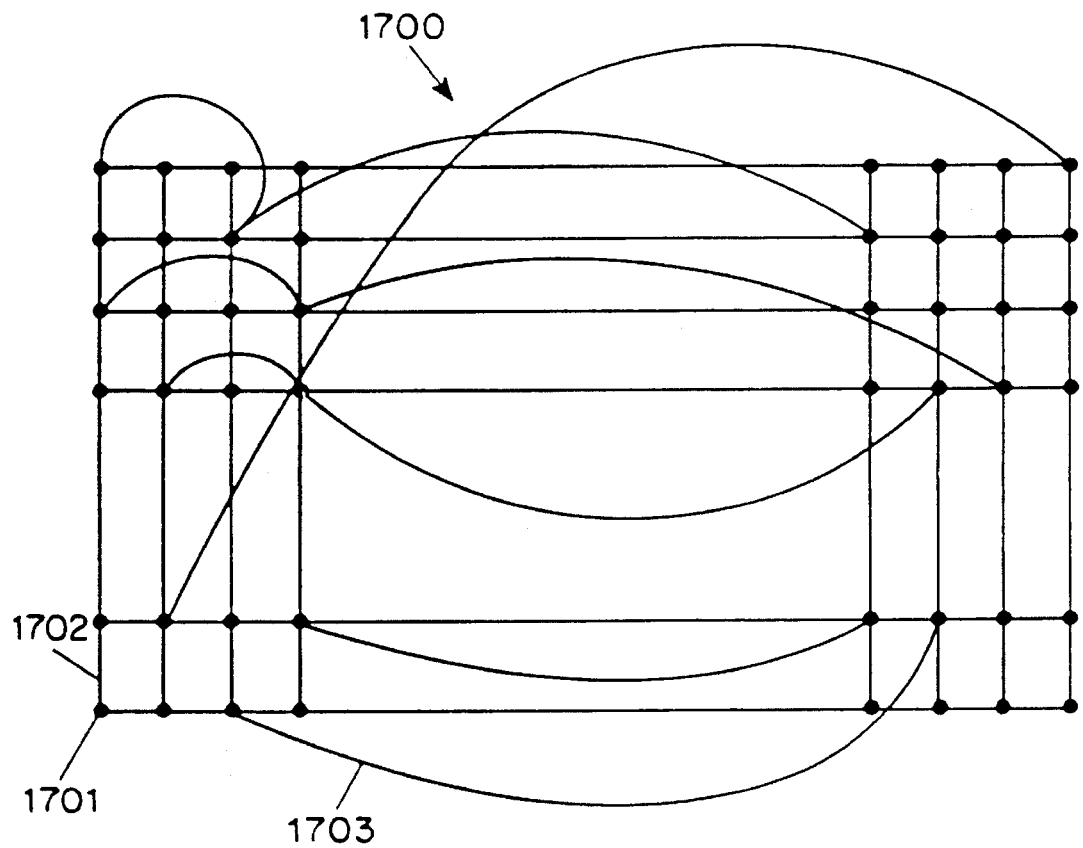
FIG. 17 is a descriptive diagram showing the use of extraplanar links according to the invention.

If the number of wavelengths, p, is greater than four, then it is possible to add new optical channels to the grid of FIG. 16, producing an optical connection graph which might appear as shown in FIG. 17. Here, each access station 1701 (shown as a cross-point) has, in addition to its north, south, east and west optical channels 1702, several additional "extraplanar-links" 1703 each of which terminates on an arbitrary other access station (for convenience, each bidirectional link required of the rectangular grid is drawn as a single link in FIG. 17). The total number of optical channels per access station is p (again, for convenience, not all of the extraplanar-links have been drawn in FIG. 17). Routing remains unchanged, except that each access station computes the Euclidean distance between the destination station and each of the stations one hop removed (north, south, east, west, extraplanar-links) and routes to the one which is closest to the destination. Routing is unambiguous; the existence of the rectangular grid ensures that at least one optical link from any given access station is certain to lead to another which is closer to the destination. If the extraplanar-links are chosen wisely, the average number of hops can be substantially removed.

We can go one step further and augment the rectangular fiber graph by the introduction of "extraplanar-fibers," adding extraplanar-fibers to each switch until there are no remaining unused ports. To create a national telecommunications infrastructure, extraplanar-fiber connections should be chosen to match prevailing traffic patterns on both an intra-city and an inter-city basis. With such an approach, the pattern of extraplanar-links is independent of the pattern of extraplanar-fibers, except that some extraplanar-link patterns may be prohibited by the fiber connection pattern (which, again, is not rearrangeably nonblocking).

The use of a rectangular grid with connectivity enhanced through the use of extraplanar-links is seen to support a method which can be executed by the processors contained within the access stations, with no processor requiring global knowledge. At each hop, the current access station routes to that neighbor closest to the destination, first ascertaining whether QOS can be maintained along that chosen link. If, at any step along the path, the required QOS cannot be maintained, the new virtual connection request would be blocked. In response to a new virtual connection request, the computational burden of each processor along the path is independent of network size N. The approach is therefore scalable, but it remains to be shown that it is modular.

Modularity

Figure 18:
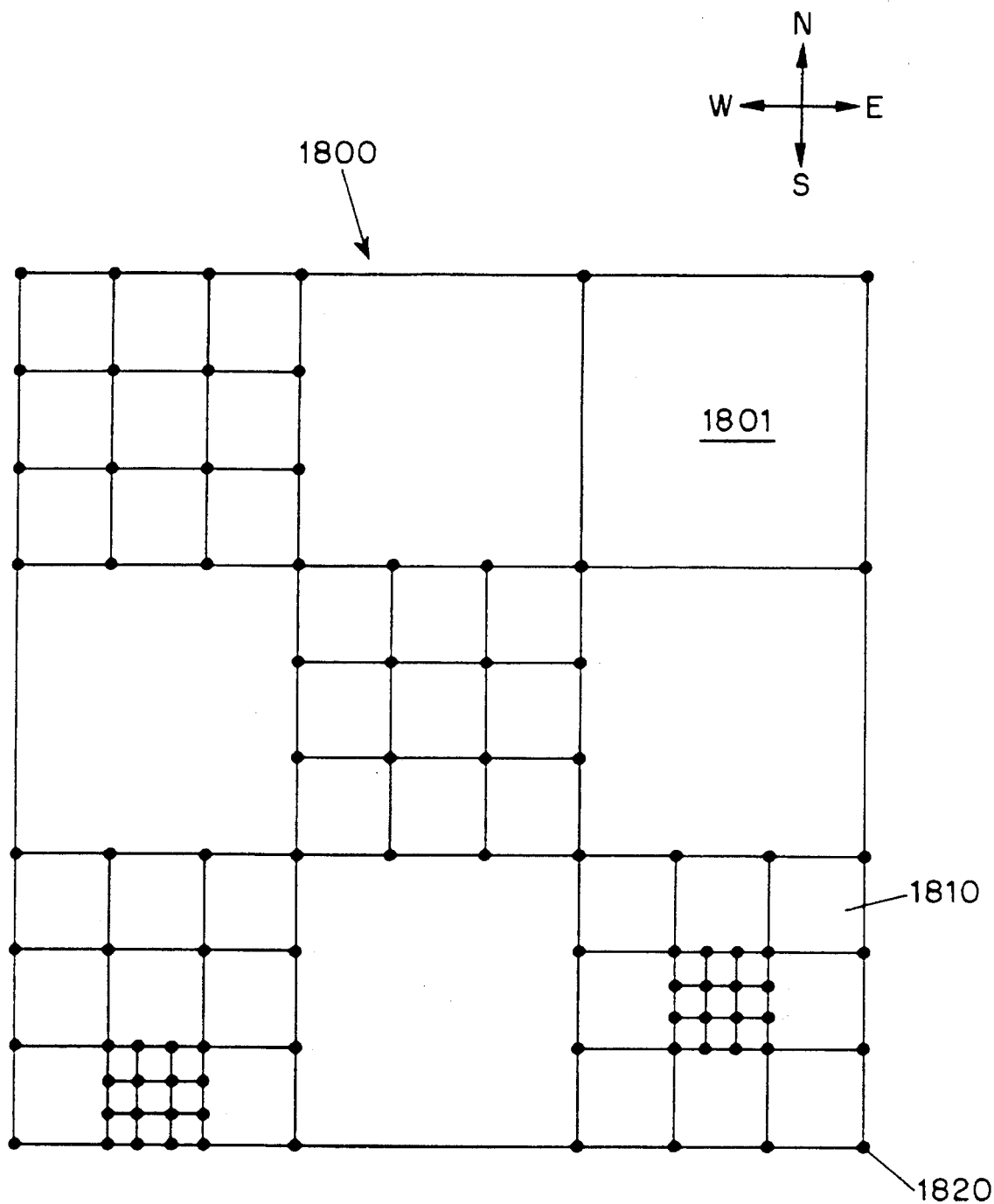
FIG. 18 is a descriptive diagram showing a recursive grid according to the invention.

Our approach to modularity is based on the notion of a recursive grid, such as shown in FIG. 18 (for simplicity, we have intentionally suppressed the extraplanar-links, which can always be added). To be more specific, a Q=3 recursive grid 1800 is shown, where Q is the number of east-west and north-south divisions needed to create a sub-division 1801. Each sub-division can be further sub-divided by Q north-south and east-west lines to form a sub-sub-division 1810, and each sub-sub-division can be further divided, etc. Note that the number Q may vary for each subdivision and sub-sub-divisions, etc. For example, in FIG. 18, Q=3 at the sub-division and sub-subdivision levels for all divisions shown, but could have been equal to 4 at any particular sub-subdivision. Each north-south/east-west intersection corresponds to an access station, and all links are bidirectional.

At any level, a sub-division is said to be complete if all (Q+1)×(Q+1) intersections 1820 are populated by access stations. Preferably, a new station can be added to any sub-division, e.g., by computer 1210 of FIG. 12, only in such a way as to populate the intersections of that sub-division without further sub-dividing to a lower level, until all intersections of that sub-division have been fully populated. Only then can a new sub-division to a lower layer be started. For example, referring to FIG. 19 (again, we consider a Q=3 recursive grid), suppose the four corners 1901, 1902, 1903 and 1904 are initially populated and connected by optical channels 1905 (closed circles, dark lines). As more access stations are added to the geographical region served by this sub-division, they must first populate the positions 1910 marked by the open circles. Then, the positions 1920 occupied by the Xs can be populated. Finally, when all open circles and Xs have been populated, a further sub-division 1930 to a lower level, represented by the lower right-hand square, can be started.

Figure 1:
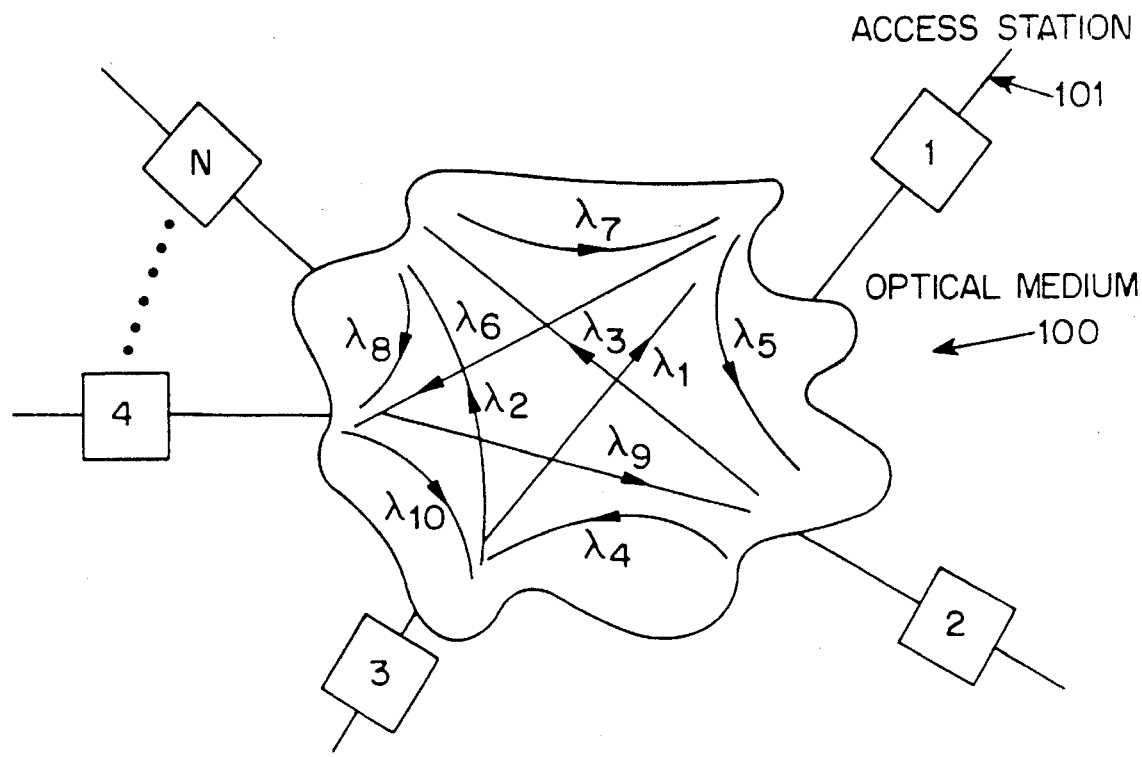
FIG. 1 is a descriptive drawing showing a canonical lightwave network and the functionality of the optical medium of a canonical lightwave network.
Figure 2:
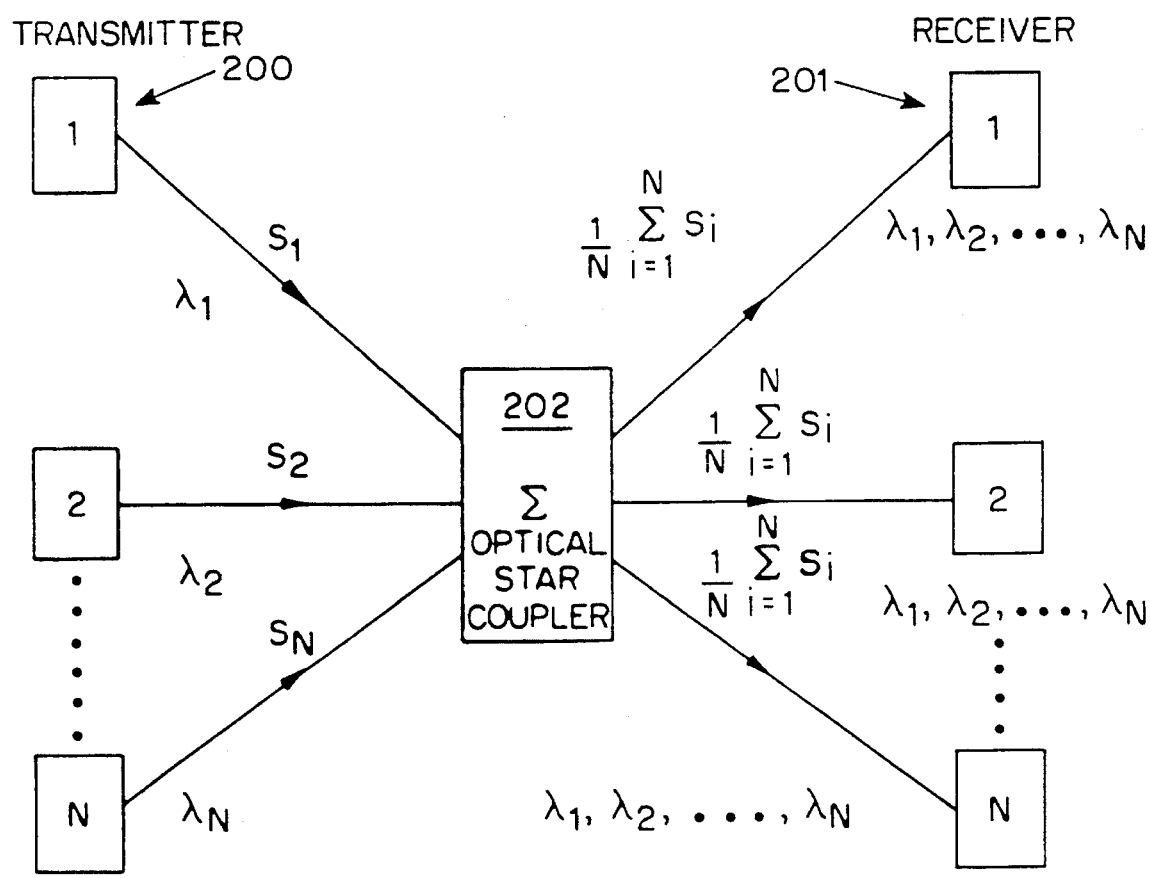
FIG. 2 is a descriptive drawing of a broadcast and select lightwave network.
Figure 3:
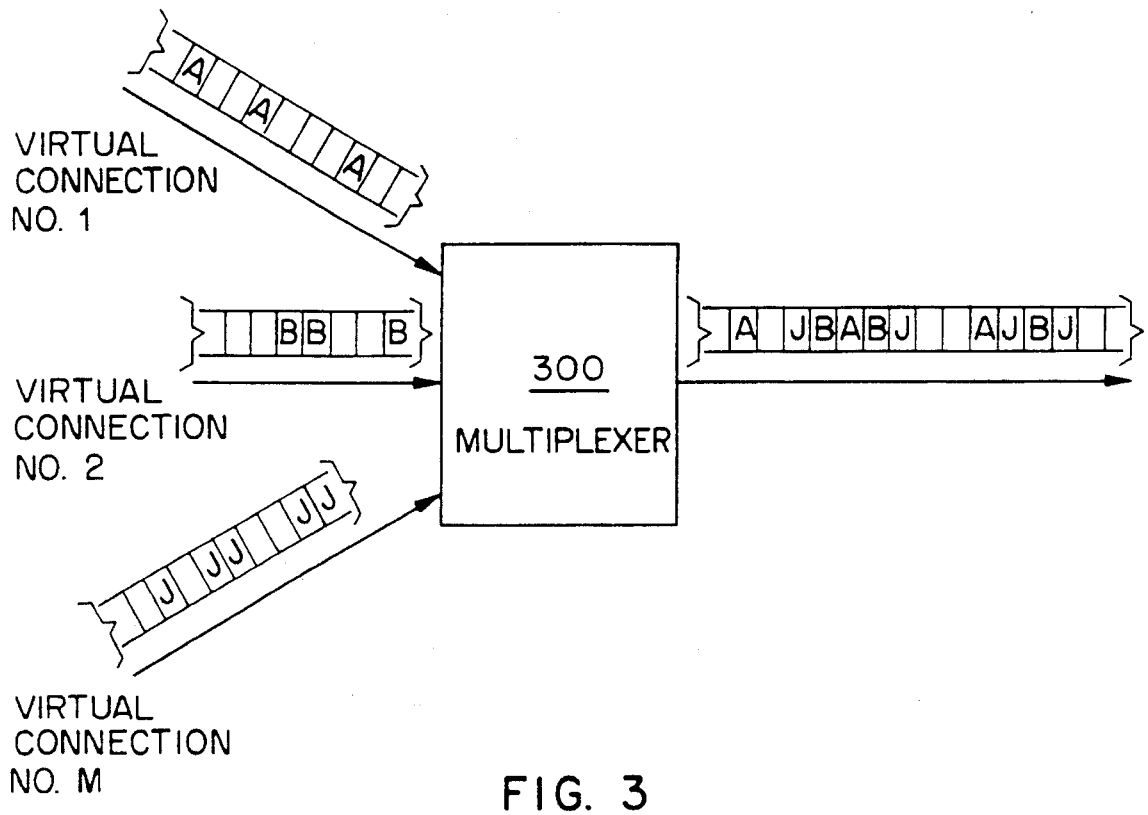
FIG. 3 is a descriptive drawing of statistical multiplexing of ATM cells corresponding to different virtual connections originated by a single user.
Figure 4:
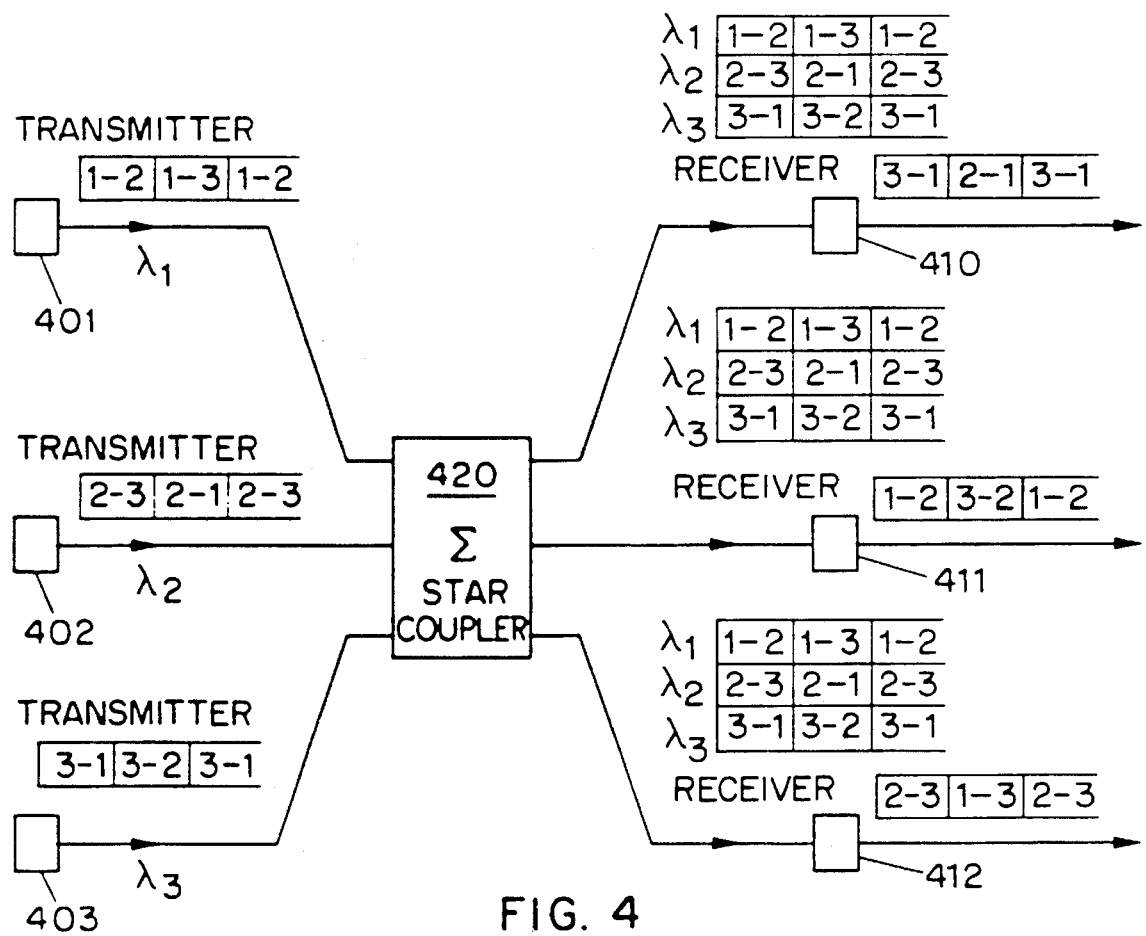
FIG. 4 is a timing diagram of a 3×3 broadcast and select network.
Figure 5A:
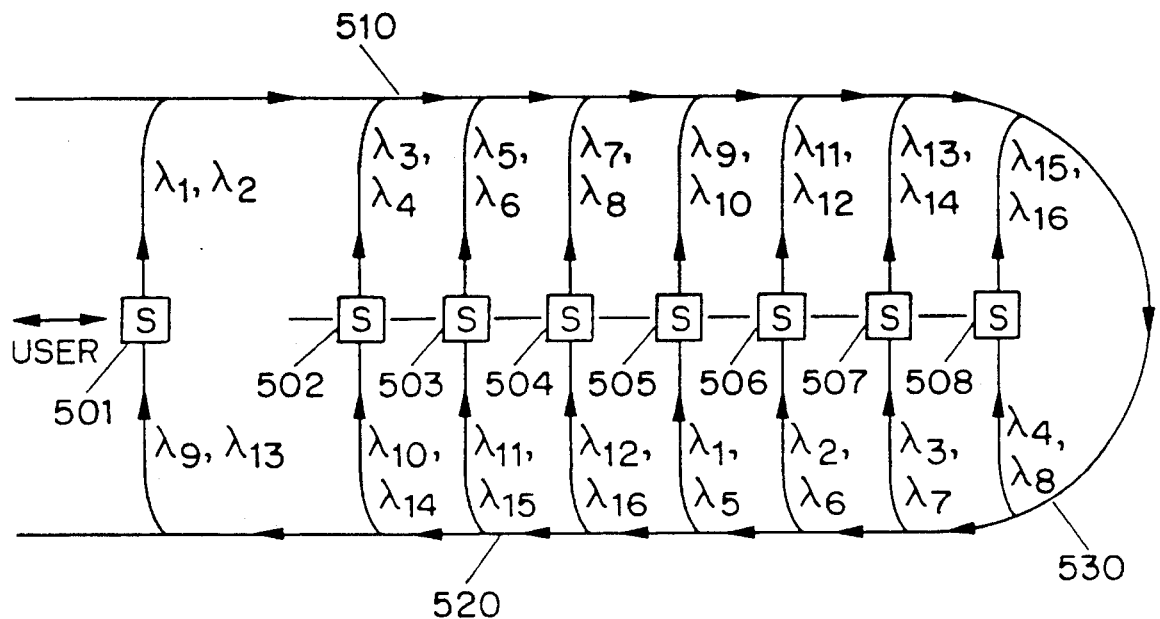
FIGS. 5a and 5b are descriptive drawings showing an eight station multihop network using a physical bus topology and the resulting optical connectivity diagram for such a network.
Figure 5B:
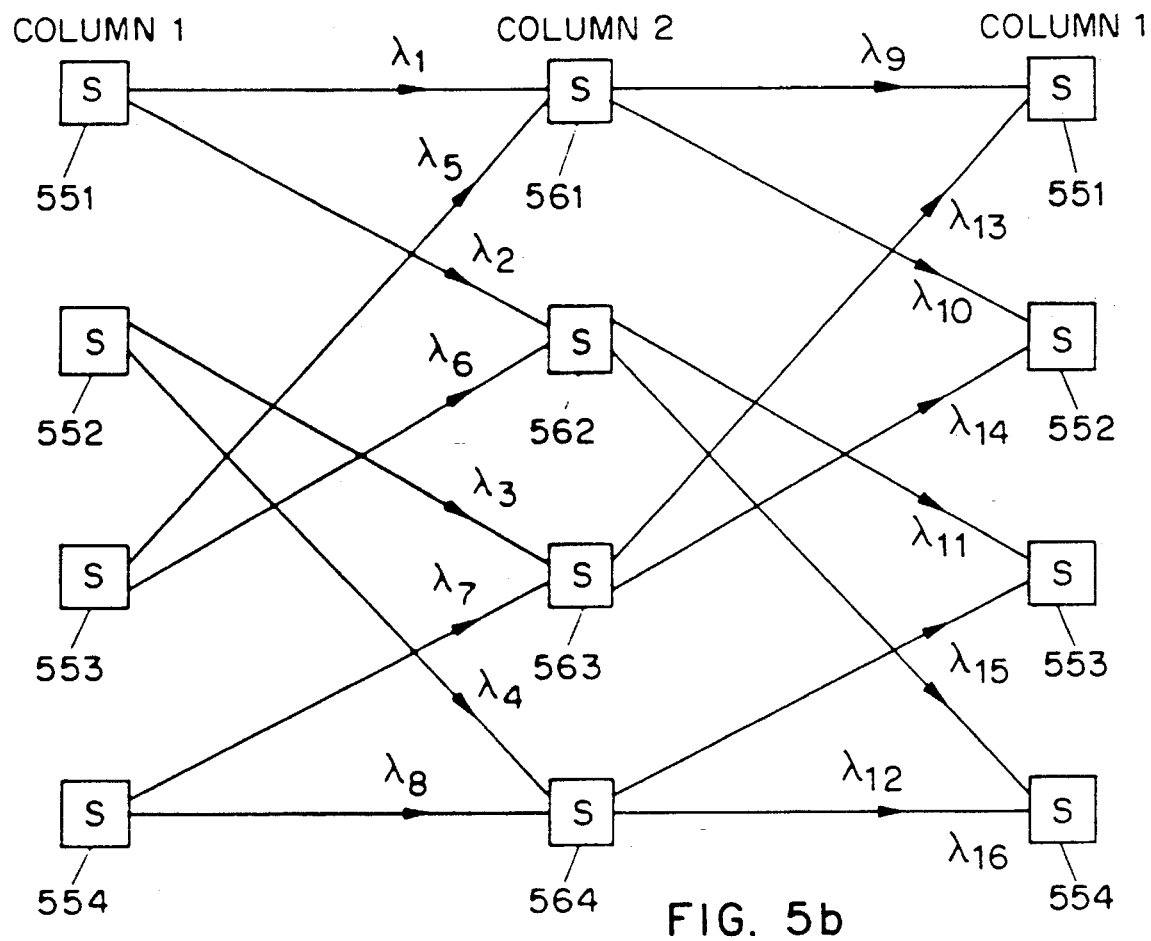
Figure 6:
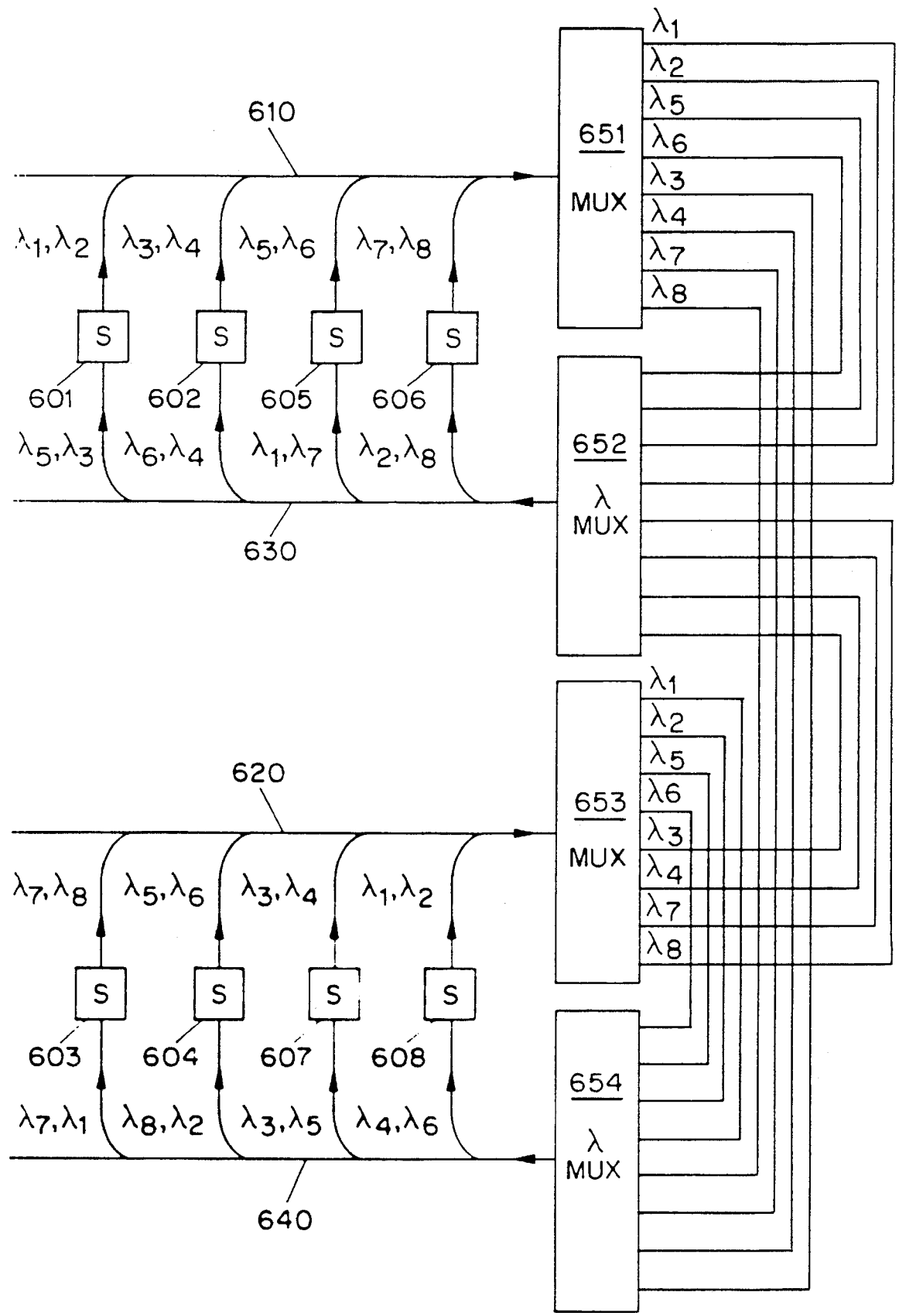
FIG. 6 is a descriptive drawing showing a wavelength re-use multihop network.
Figure 7:
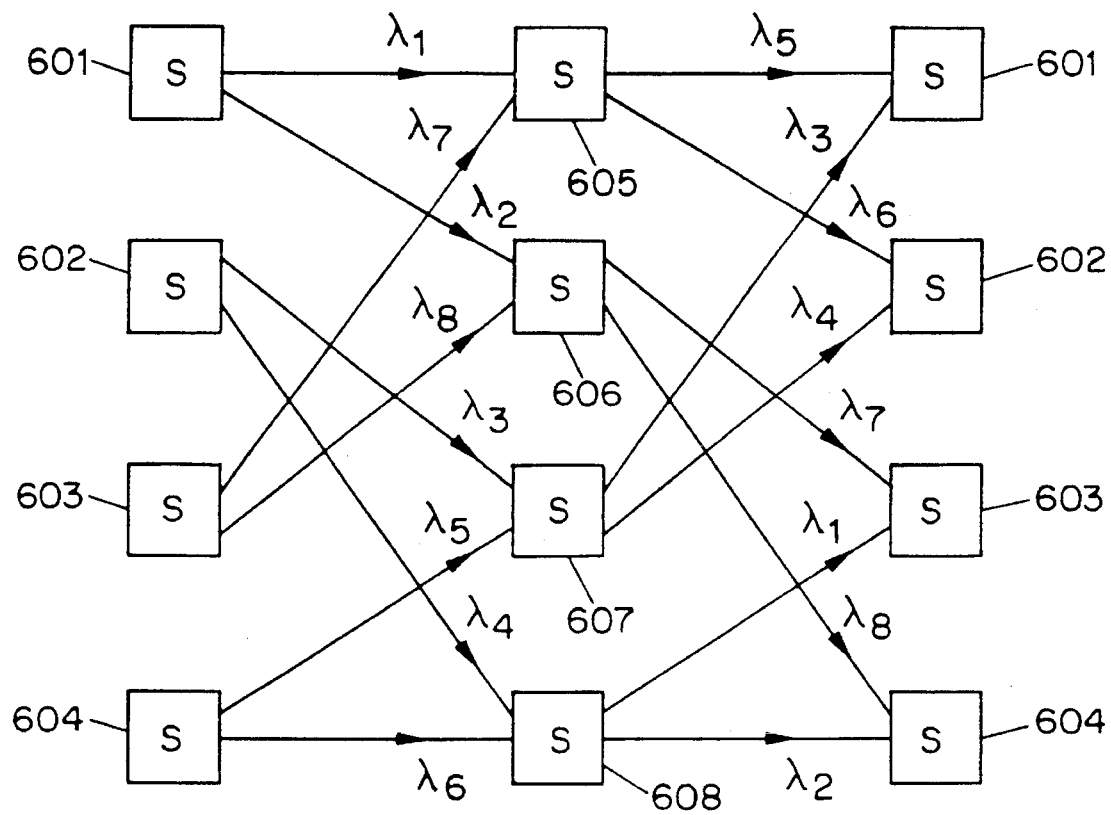
FIG. 7 is a descriptive drawing showing the resulting connectivity diagram for the network shown in FIG. 6.
Figure 8:
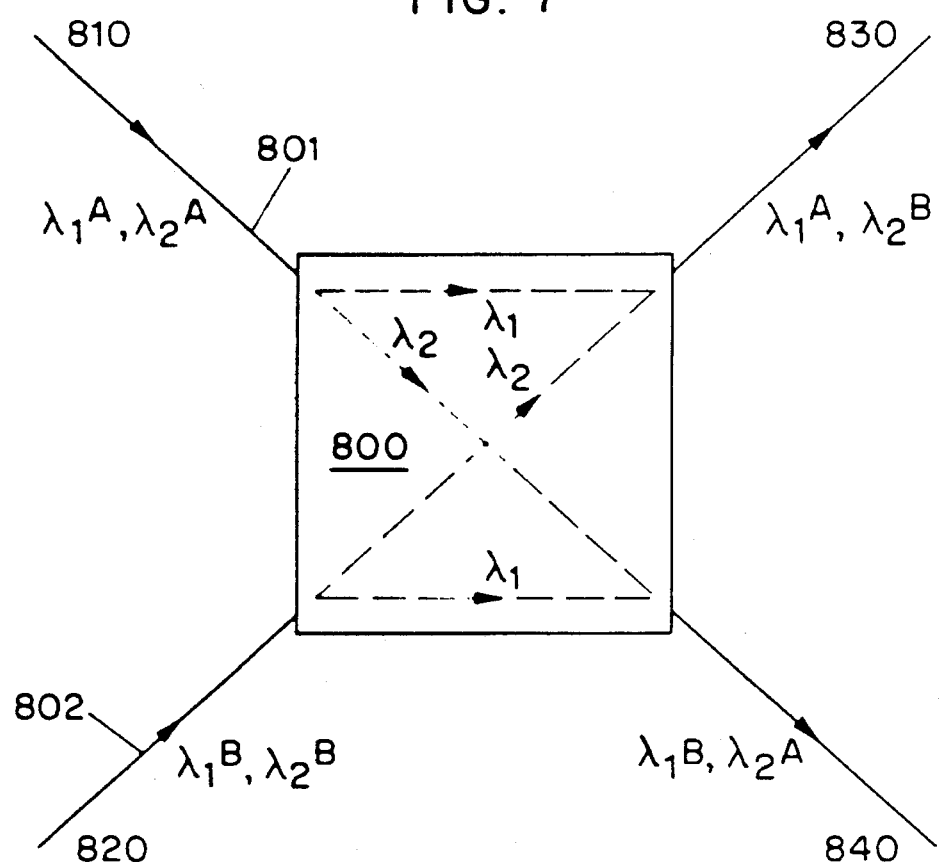
FIG. 8 is a descriptive drawing showing a 2×2 wavelength selective optical switch.
Figure 9:
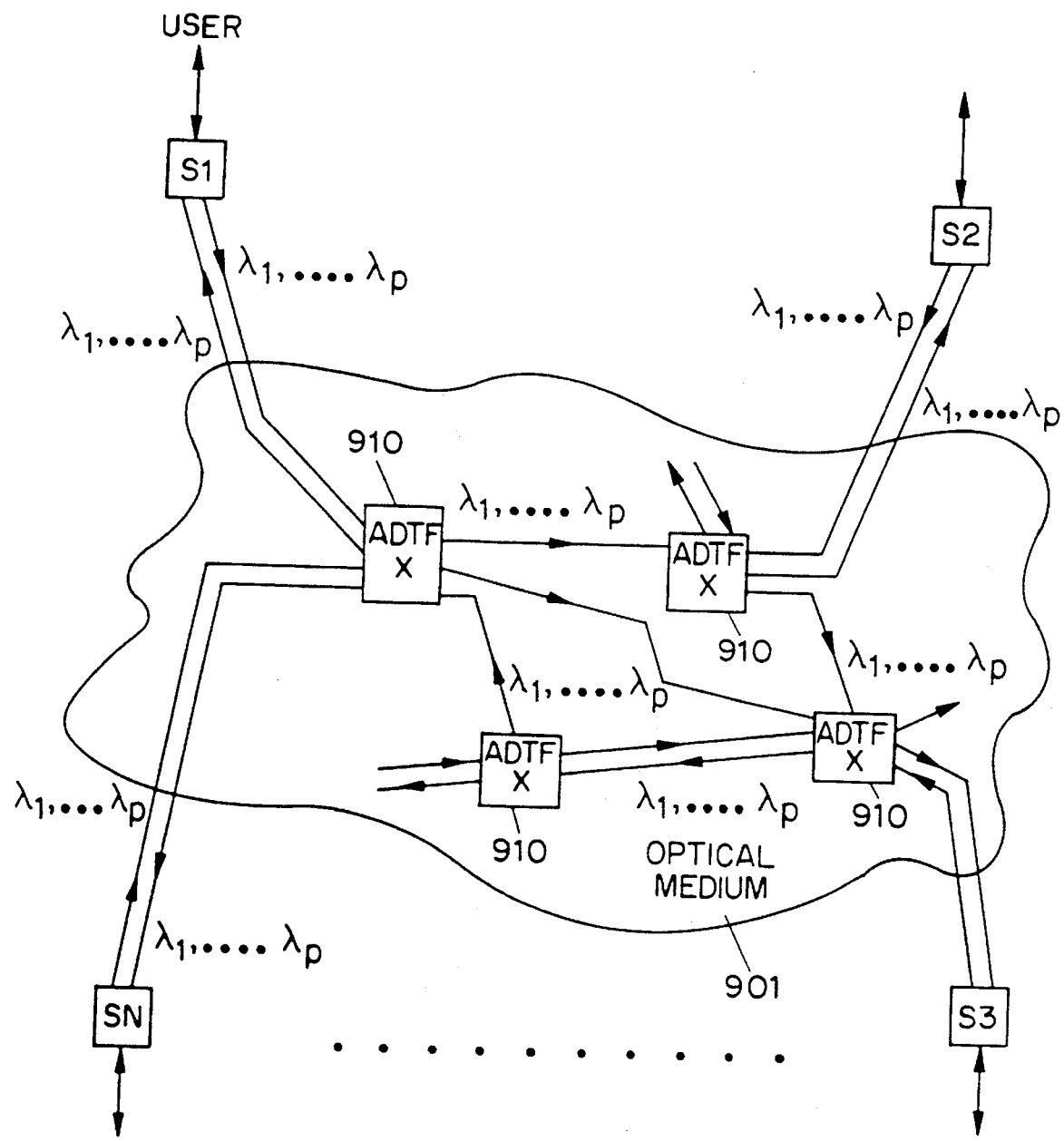
FIG. 9 is a descriptive drawing showing a generic model for a wide area lightwave network.
Figure 10:
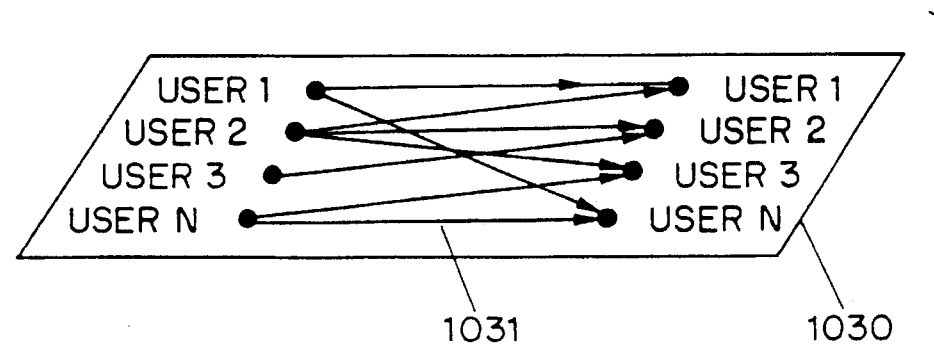
FIG. 10 is a descriptive drawing showing the layering of a lightwave network.
Figure 10:
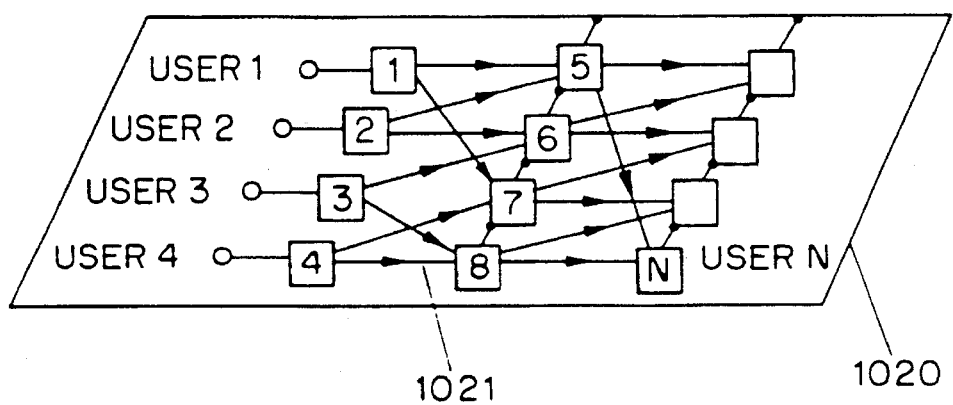
Figure 10:
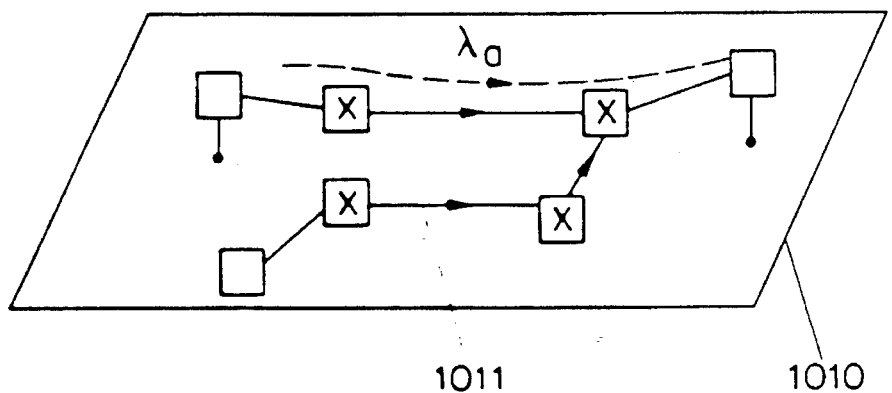
Figure 10:
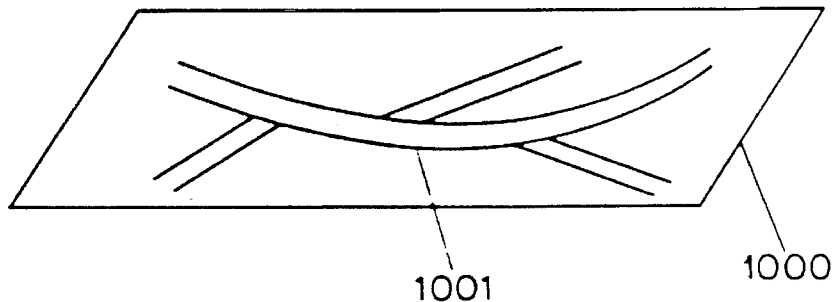
Figure 11:
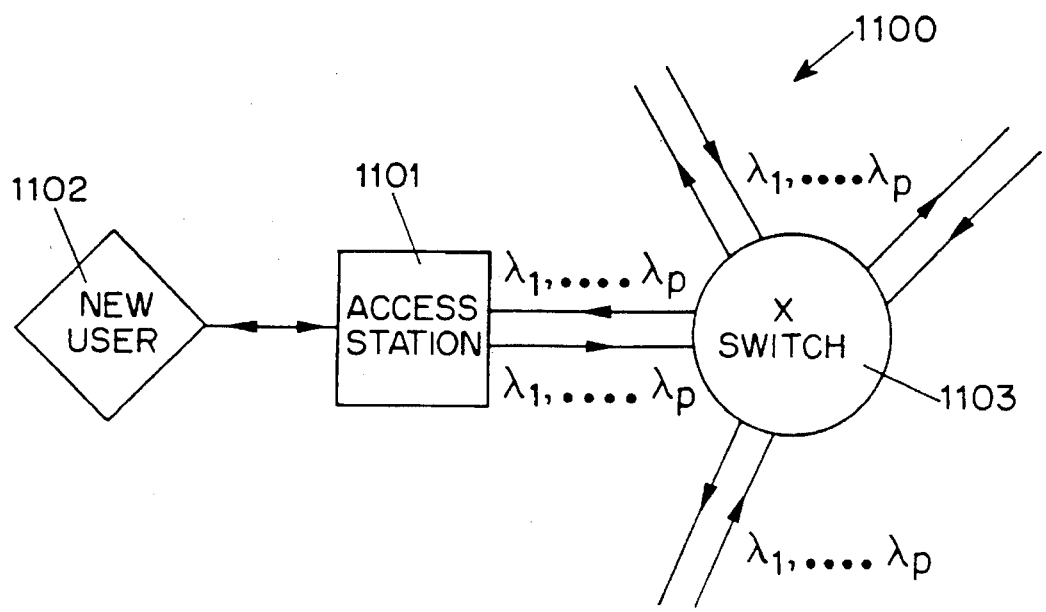
FIG. 11 is a descriptive drawing showing a generic access module.
Figure 19:
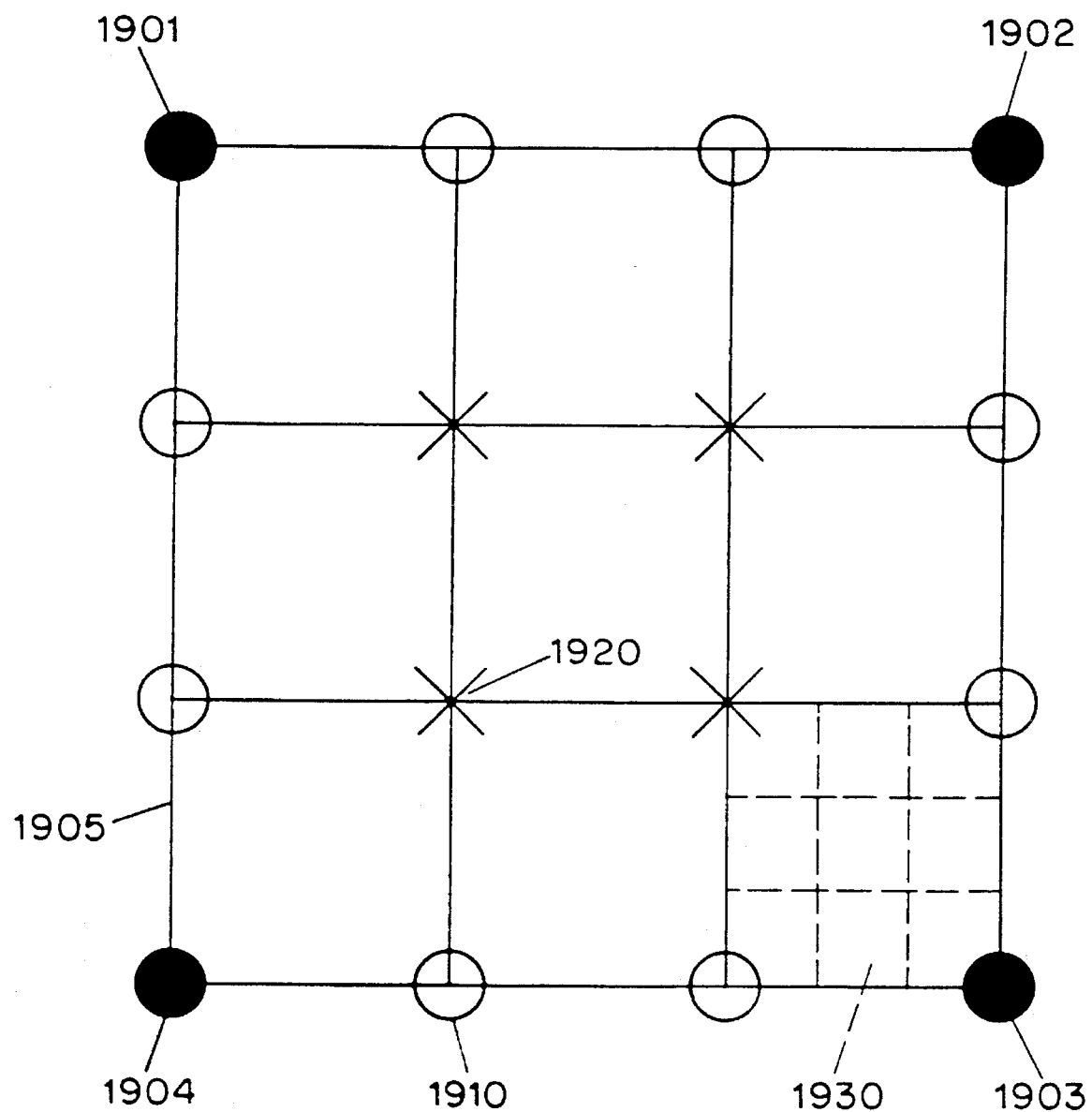
FIG. 19 is a descriptive diagram showing a modular growth of a recursive grid according to the invention.

Adding a new station generally involves adding both its access station and its switch; the procedure suggested by FIG. 19 therefore applies to both the fiber graph and optical graph layers of FIG. 10. Extraplanar-fibers and extraplanar-links can be arbitrarily added.

By sub-dividing in this fashion, we achieve modular growth while permitting use of the aforementioned routing technique with only slight modification, which will be described in detail below. Since, at a given level, the number of access stations in a complete sub-division is a constant (independent of network size), the number of head-end paths per sub-division is a constant, and the approach remains software scalable.

Routing Methods in a Recursive Mesh Network

We present two preferred routing techniques that can be used in a recursive mesh. The routing techniques are preferably used to route information through real or virtual channels in the optical connectivity mesh, and to route information through fiber channels in the underlying fiber connectivity mesh. The techniques may be implemented by an external or internal routing system, such as computer 1210 of FIG. 12. Both inventive routing methods, referred to as "head-end routing" and "right-hand-rule routing," assume that each access station occupying a node stores the path to and address of all access stations no more than H≧I hops away in a local table T or some other form of memory. This requires constant storage, independent of network size, since the degree of the network is bounded.

For both methods, D(A, B), or the Manhattan distance between node A and B, is as follows:

$$D(A, B) = \text{abs }(X(A)-X(B))+\text{abs}(Y(A)-Y(B)), \quad (3)$$

where X(A)=the X coordinate of Node A. Note that the Euclidean distance metric can also be used. This distance is in the address space, and may only loosely reflect real distances between nodes.

Head-end routing

Recall that when recursive grid networks are constructed, that squares are replaced by grids to grow the network. If at any stage in the growth of the network, a square is replaced by a grid, the lower-left access station in the original square is called a "head-end" for the unconnected users in the square. Note that each access station can have multiple head-ends stations.

Also recall from the recursive grid construction that a square is replaced by an incomplete grid, as shown e.g. in FIG. 13, if and only if there will be no unconnected access stations in the original square after the stations are connected to the incomplete grid. Consequently, there cannot be unconnected nodes in a square in the incomplete grid. Stated in another way, an incomplete grid can replace only a complete grid's square, not an incomplete grid's square. Consequently, the head-end node at the lower-left corner of an incomplete grid can store, in a finite space independent of network size, all the routing information needed to route within the finite sized incomplete grid, and each node in the incomplete grid can store in a constant amount of memory the path to the nearest head end of the incomplete grid. This information may be stored in a local table H by each effected node. A fixed amount of storage can be used because the incomplete grid cannot be grown as complete grids can.

Consequently, the following routing method, requiring a bounded amount of storage per access station, can be used to route from node A to node B:

Define Route(A, B) as follows: Use a local routing table to reach B if B is in the routing table.

Else: Go East or West as needed until Xaddress(A)= Xaddress(B). if blocked,

Route (A', HeadEnd (A')),
Route(HeadEnd(A'),HeadEnd (B)),
Route(HeadEnd(B),B), where A' is the last node reached before being blocked.

Go North or South as needed until Yaddress(A)=Yaddress(B).

if blocked, Route(A',HeadEnd(A')),
Route(HeadEnd(A'),HeadEnd(B)),
Route(HeadEnd(B),B), where A' is the last node reached before being blocked.

The head-end-routing scheme, which is in a form of hierarchical routing, simply routes along the grid links using the greedy algorithm. When the greedy algorithm is blocked, traffic is routed toward the destination over the links of the next higher level mesh in the network using the greedy algorithm.

Figure 20:
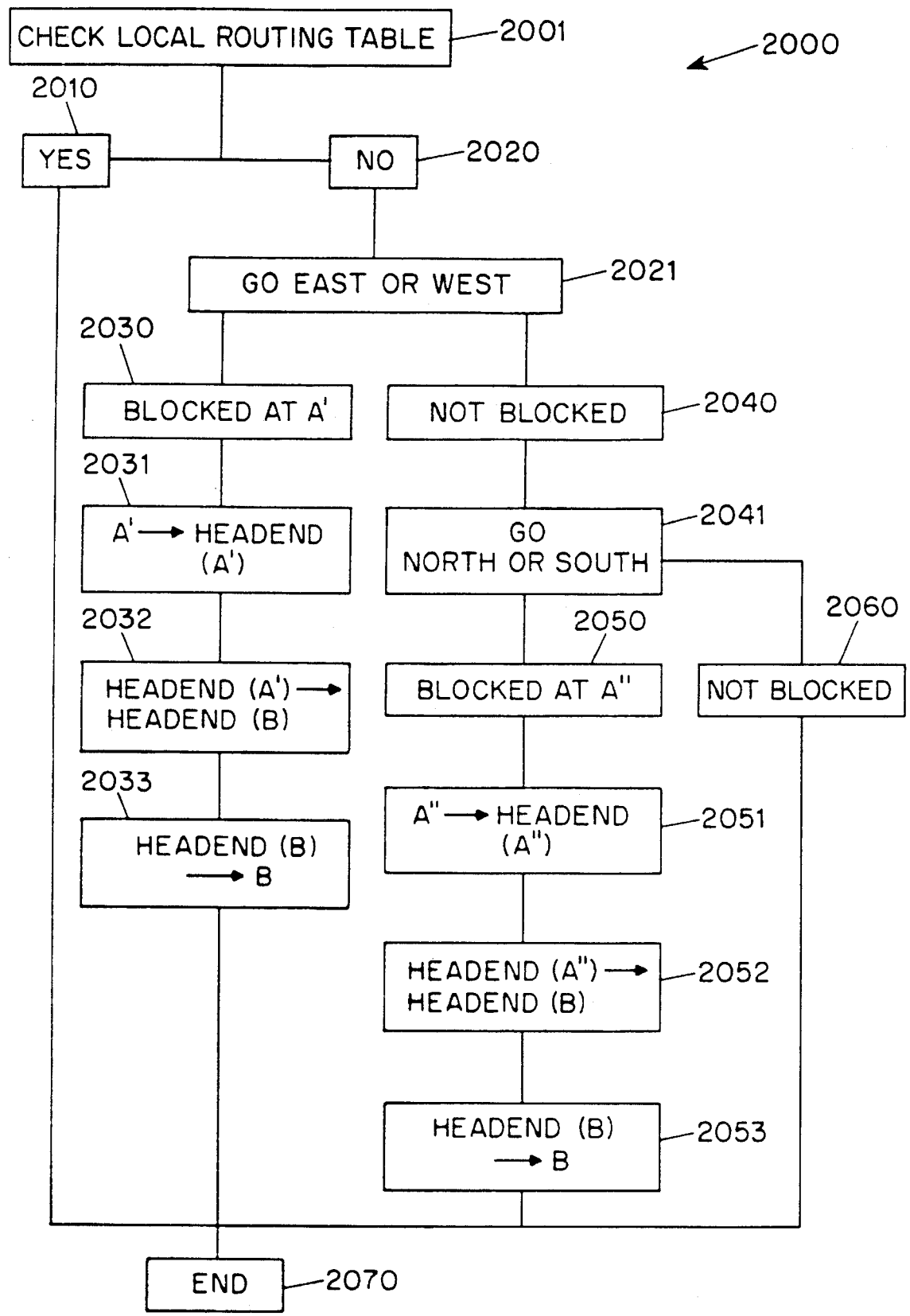
FIG. 20 is a flow chart of the head-end-routing algorithm.

The head-end-routing scheme will now be explained in further detail with reference to FIG. 20. Flow-chart 2000 presents the basic steps performed by computer 1210 to route traffic over the network links from an access station at node A to an access station at node B.

Local routing table 2001 is used to route to B if B is held within the table (indicated by Yes step 2010). When traffic is routed to B, the routing scheme is complete 2070. If routing table 2001 cannot be used to route traffic to B 2020, the traffic is routed East and West 2021 until the Xaddress is at the Xaddress of B 2040, or until the path is blocked at node A' 2030.

If the east/west path is blocked, traffic is routed from A' to the headend of A' 2031, then to the headend of B 2032, and finally to B 2033. If the path is not blocked 2040, traffic is routed north or south 2041 until the Yaddress is at the Yaddress of B 2060, or until the path is blocked at node A" 2050.

If the north/south path is blocked, traffic is routed from A" to the headend of A"2051, then to the headend of B 2052, and finally to B 2053. If the path is not blocked 2060, then the X and Y address of the current node is the same as B; hence, the traffic is at B, and the routing is finished 2070.

Barring network faults, head-end routing is guaranteed to find a path between any pair of nodes if the network is constructed as described above. In the presence of network faults, head-end routing can often find routes between pairs of nodes even if the path that would be taken in a fault-free network includes a fault.

Right-Hand-Rule Routing

To execute this method, each node need only store the table T defined above. Qualitatively, this method routes using greedy routing until it is blocked. If blocked, there is an obstacle (i.e. an area of the network without links) between the current position and the destination. A probe packet is sent around the obstacle using the right-hand rule. The right-hand rule can be used because no links in the network cross, even in the presence of network faults. The probe packet, upon returning to its starting point, reports the number of links to traverse around the obstacle using the right-hand rule to get as close to the destination as possible while remaining adjacent to the obstacle. If this number is zero, there is no path to the destination and routing is aborted. Otherwise, the router routes across the specified number of links around the obstacle using the right-hand rule and then resumes routing using the greedy algorithm. The same technique is used each time the router is blocked. Using this routing technique, a route will always be found if a route exists.

The right-hand-rule routing algorithm is derived from the conventional canonical right-hand-rule maze traversal algorithm and can be used because the recursive grid network is planar. The algorithm for routing from node $n_s$, to $n_d$ is as follows:

Define $D(n_1, n_2)=|X\ address(n_1)-X\ address(n_2)|+|Y\ address(n_1)-Y\ address(n_2)|$.

(0) Start at node $n_s$.
(1) If at node $n_d$, Stop: the destination has been reached.
(2) If at node n and there is a link l leading to node nl such that $D(nl, n_d)<D(n, n_d)$ then move to node nl. Otherwise,
(3) Pretend all the links in the networks are hallways, and all the access stations are intersections of hallways. Face in the direction of $n_d$. Turn left to the first hallway and walk down it, turning right at every intersection, until a node $n_g$ is reached such that $D(n_g, n_d)<D(n_p, n_d)$ for all $n_p \in N$, the set of all nodes already visited in the route. Goto (1).

This right-hand-rule routing algorithm will find a path between any two nodes in any connected planar network because the recursive grid is connected and planar even in the presence of network faults. No routing table needs be stored.

Figure 21:
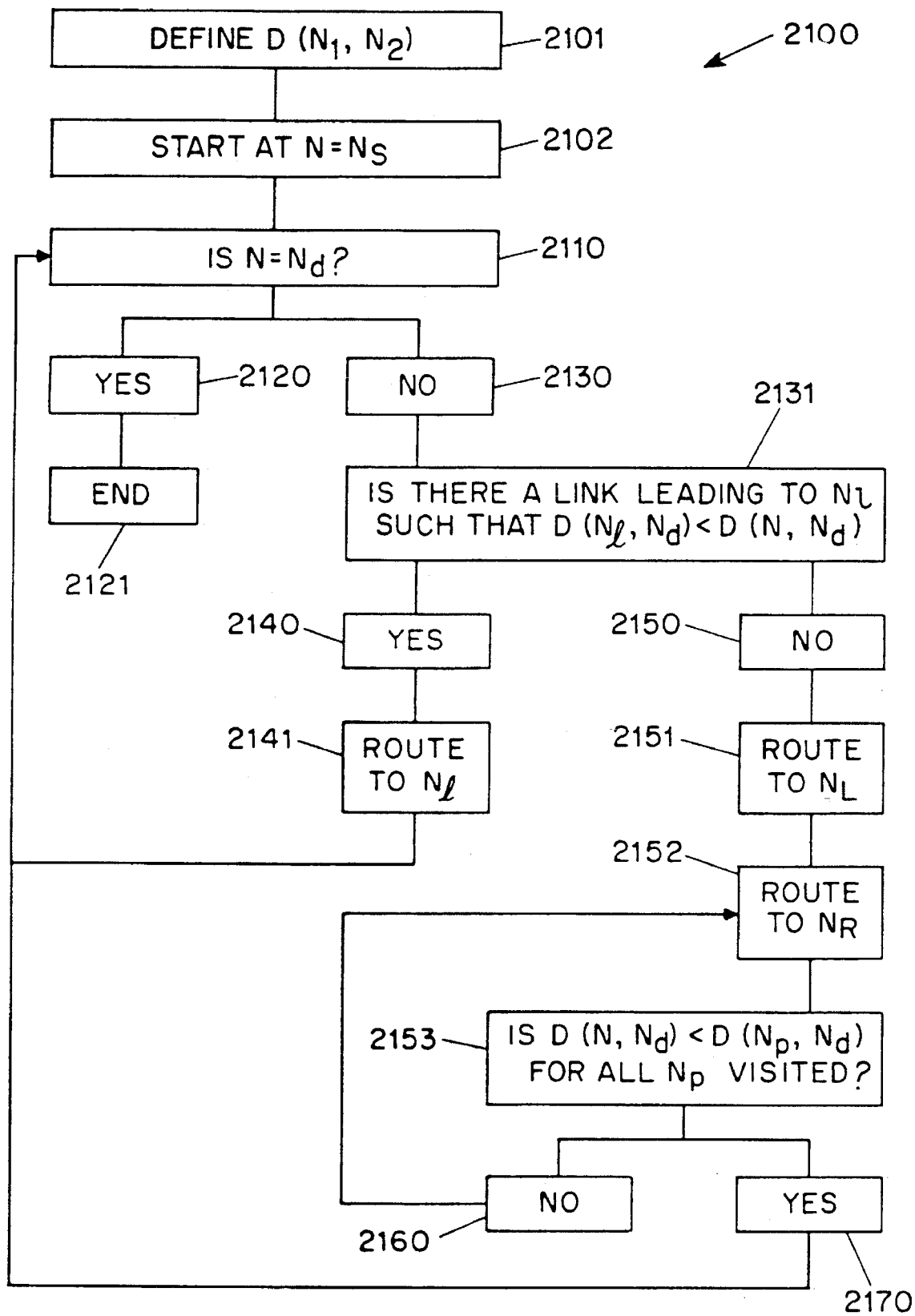
FIG. 21 is a flow chart of the right-hand-rule routing algorithm.

The right-hand-rule routing algorithm will now be explained with reference to FIG. 21. Flow-chart 2100 of FIG. 21 presents the basic steps performed by routing computer 1210 to route traffic through a recursive grid from an access station at node $N_s$ to an access station at node $N_2$.

After defining the distance $D(N_1, N_2)$ 2101, the algorithm begins at node $n_s$ 2102. Routing computer 1210 then checks to determine whether the current node, N, is in fact $N_d$ 2110. If $N=N_d$ 2120, the routing of traffic is accomplished 2121. If N is not $N_d$ 2130, further routing is required.

It is next determined whether there is a link l leading to a node $n_l$ such that the distance from $n_p$ to $n_d$ is less than the distance from the present node n to $n_d$ 2131. If there is such a link l 2140, traffic is routed over that link 2141, and the new node n is compared with $n_d$ 2110 again.

If there is not such a link l 2150, traffic is routed to $n_L$ 2151, the node at the immediate left of a line connecting $n_d$ and n, and then to $n_R$ 2152, the node at the immediate right of $n_L$. It is determined whether the distance between the present node n and $n_d$ is less than the distance between all previous nodes visited in this route, $n_p$, and $n_d$ 2153. If the distance is not the lowest 2168, the traffic is again routed to the next $n_R$ 2152. If the distance is the lowest 2170, the present node n is compared to $n_d$ 2110 again.

Routing in the Recursive Grid with Extraplanar Links

Routing in a recursive grid with extraplanar links can be easily performed using a simple modification: extraplanar links are used any time the station at the other end of the link is closer to the destination that any earlier station in the route. Routing is then resumed by restarting routing at the far side of the extraplanar link. For all other routing purposes, extraplanar links are ignored. This rule cannot cause repeated cycles, and a route can always be found to the destination if either right-hand-rule or head-end routing is used.

Therefore, either of the routing methods described above will work using extraplanar links when the extraplanar links are taken into account when constructing the local routing table T, and/or when the extraplanar links are taken any time the access station at the other end of the link is closer to the destination than any previous node in the route (to prevent cycling). The routing methods may also be modified in other, possibly more complicated, ways.

In particular, no matter what routing method is used, the right-hand-rule routing method ignoring the up connections can always act as a fallback routing method, always finding a path from the source to destination if a path through the recursive grid foundation exists.

EXAMPLE

Connecting the 100 Largest U.S. Cities

Because the recursive grid is both modular and scalable, a network of any number of switches can be constructed. Consequently, if a network designer wishes to interconnect N access stations, the designer can construct an arbitrary N switch recursive grid network and attach one station to each switch in the network using an access station, thereby creating a network interconnecting the N stations.

Figure 22:
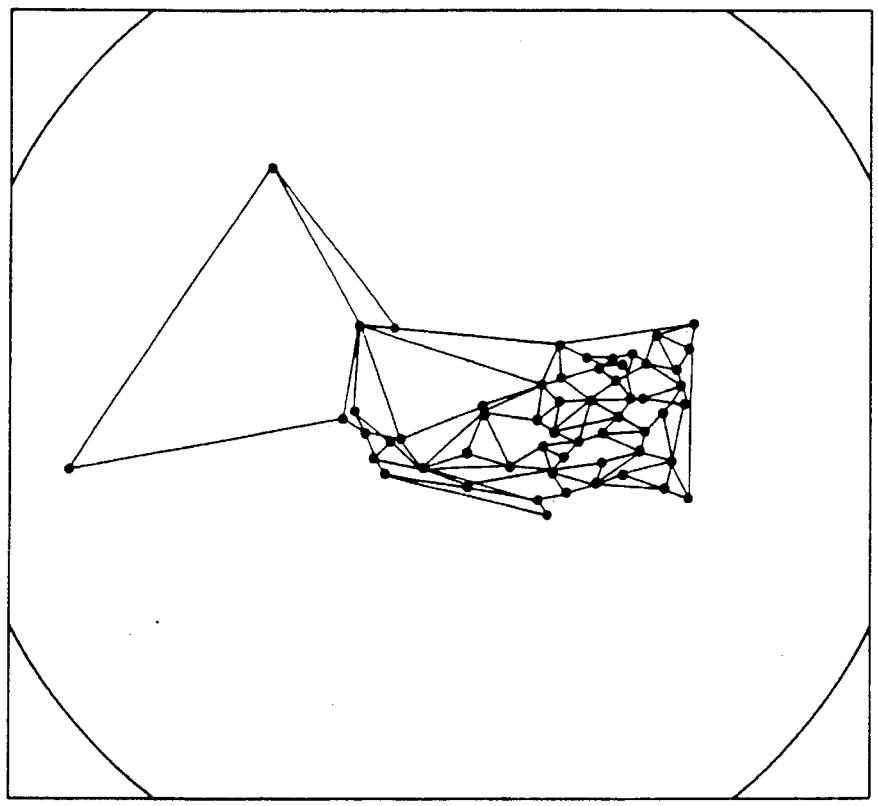
FIG. 22 is a descriptive diagram showing a recursive grid according to the invention.
Figure 23:
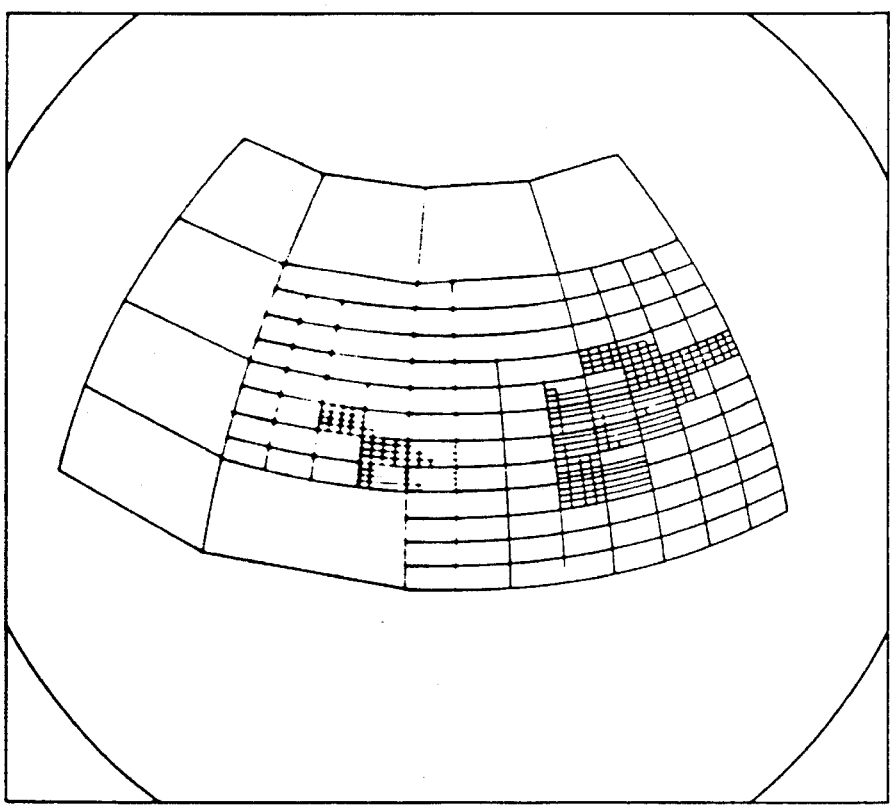
FIG. 23 is a descriptive diagram showing a different view of the recursive grid of FIG. 22.

Using the method described above to construct a network connecting 561 stations in the 100 largest cities in the United States, the recursive grid network depicted in FIG. 22 was constructed via a Monte Carlo simulation. This network hardly looks like a recursive grid. However, the same network is depicted in FIG. 23 in which the switches are located in the intersections, and the recursive grid nature of the network is obvious. This network has the same basic form as the recursive grid in FIG. 18; only the access stations have been moved, while the connectivity remains unchanged.

In performing this simulation, users were assumed to reside only within the 100 largest cities in the United States. The number of users within each city was equal to a constant times the population of the city, rounded up. Users within a city are distributed about the city center according to a Gaussian distribution. Further, all users were assumed to generate the same amount of traffic. Calls were of constant bandwidth b, which is some fraction of the unit network link capacity 100%. A call arrival at each node is a random variable in accordance with the Poisson distribution with rate $\lambda$ and call holding time is exponential with average holding time $1/\mu$. With a probability of 0.5, a call was considered a "national" call; otherwise, a call was considered a local call. National calls from each node were uniformly distributed among all stations in the network. Local calls were uniformly distributed among all stations in the same city.

In an attempt to create an optical network to effectively carry the traffic described above, a recursive grid network with up connections was constructed. The recursive grid foundation was constructed as described above. The up links (1 or 2 per station) were connected as follows: half the up connections within each city were connected randomly (i.e., according to a uniform distribution) within the city. Once all the intra-city up-links were defined, the remaining half of the up links were connected randomly. The 'random' connections were constructed by randomly selecting (all stations equally likely to be chosen) two stations from a pool of unconnected stations, connecting their up ports with a bidirectional link, and removing the stations from the pool of unconnected stations. The capacity of an network links is normalized to 1.

This procedure was used to create the fiber connectivity among access stations. Over each fiber, a single optical connection of unit capacity was established, forming an optical topology identical to the fiber topology. In addition, a single bidirectional channel of capacity C=100% connected the user and its associated access station. Calls were routed over this optical topology using fixed routing (either right-hand-rule or head-end routing). Saturated links blocked arriving calls.

Four configurations were simulated: a 561 node centralized switch configuration, where network links were assumed to have infinite capacity, while user access links had unit capacity; a 561 node network using head-end routing with one up connection per access station; a 561 node network using right-hand-rule routing with one up connection per access station; and a 561 node network using right-hand-rule routing with two up connections per access station.

Figure 24:
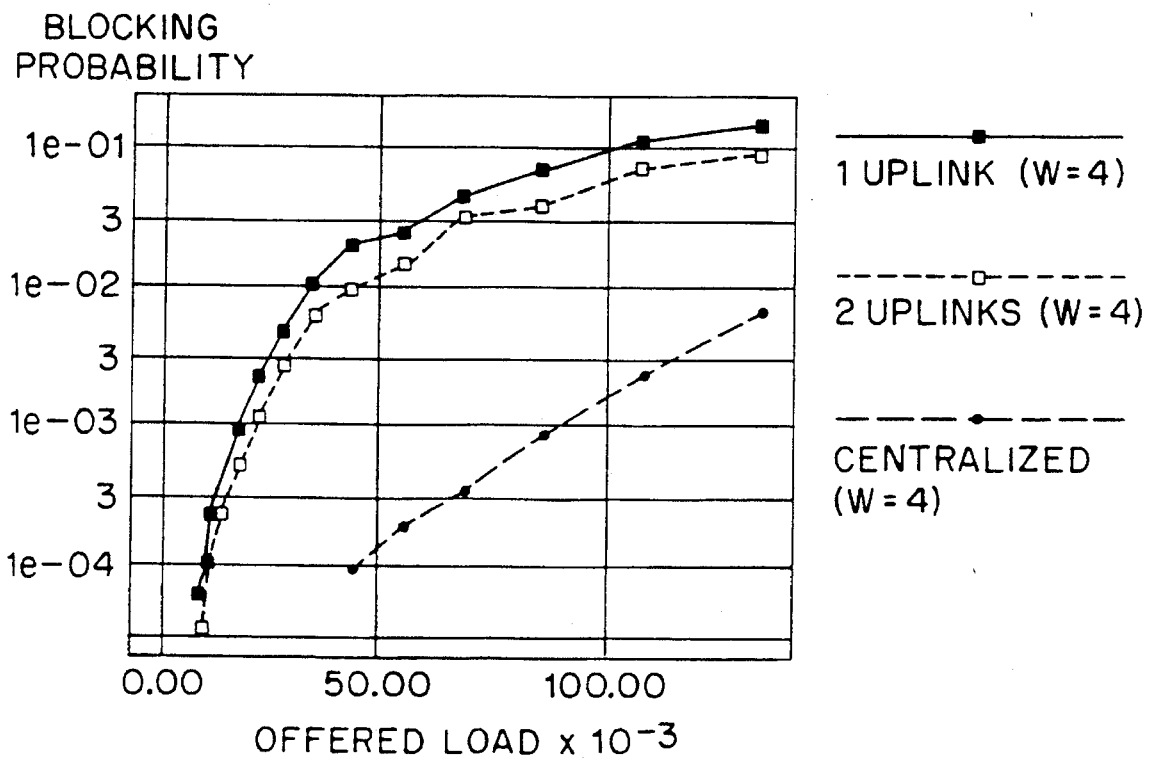
FIG. 24 is a graph showing simulation results using the right-hand rule method.
Figure 25:
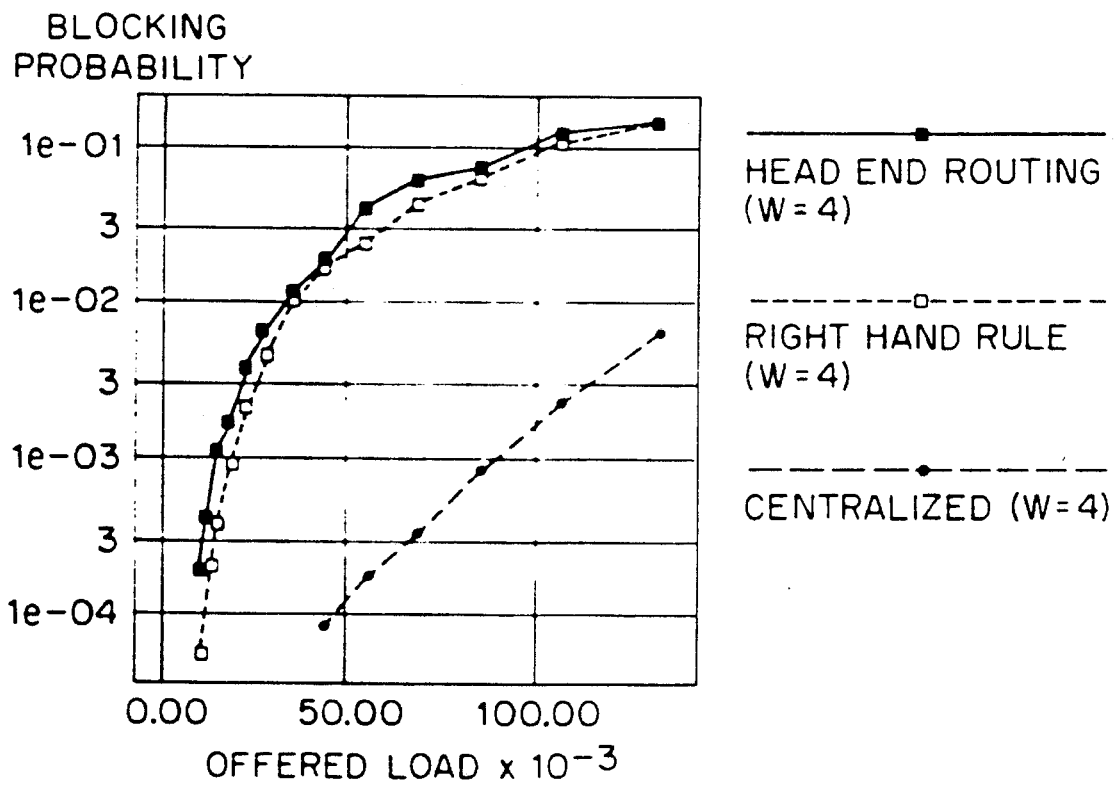
FIG. 25 is a graph showing simulation results comparing the right-hand rule method to the head-end routing method.

Simulation results are shown in FIGS. 24 and 25. The 'load' in this plot is defined to be $\lambda/\mu$, where $\lambda$ is the call arrival rate per node, $\mu$ is the average call holding time. There are four wavelengths. In FIG. 24, we plot the blocking probability of the right hand rule for one and two up-connections, respectively. We notice that, for a given blocking probability requirement, the improvement in network capacity by increasing one up-connection is marginal.

In FIG. 25, we compare the blocking performance of the right hand rule and the head-end routing, assuming that there is one up-connection. We observe that, for a given blocking probability requirement, the maximum load the network can support under the right hand rule is higher than that under the head end routing.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention.

We claim:

1. A method for providing a recursive mesh network for connecting a plurality number of access stations within a service area by connecting links, comprising the steps of:

(a) dividing said service area into M×N regions, having (M+1)×(N+1) corners, M and N being integers ≧2, wherein each side of each region corresponds to a bidirectional connection link;

(b) assigning a new access station at an unoccupied region corner and connecting said new access station to corresponding connection links, until (M+1)×(N+1) access stations have been connected;

(c) determining, after all (M+1)×(N+1) region corner have been occupied, for each additional new access station, which of said regions said additional new access station falls within;

(d) when said determined region has not been divided, dividing said determined region into M'×N' sub-regions having (M'+1)×(N'+1) sub-region corners, M' and N' being inters ≧2;

(e) when said divided determined sub-region has less than (M'+1)×(N'+1) access stations within it, assigning said additional new access station at an available corner of said sub-region and connecting said new additional access station to bidirectional connection links that lead to at least one other access station within the same sub-region; and (f) when said divided determined sub-region has (M'+1)× (N'+1) access stations therewithin, repeating steps (c)–(f) with respect to that sub-region until said new additional access station is connected.

2. The method of claim 1, further including the step of:

(g) adding at least one extraplanar-link to said recursive mesh network, wherein each extraplanar link connects a first access station within said recursive mesh network to a second access station within said recursive mesh network.

3. The method of claim 2, wherein said first and second access stations are selected in response to current prevailing traffic patterns within the service area.

4. The method of claim 2, wherein at least one extraplanar link is bidirectional.

5. The method of claim 2, wherein said access stations are connected to said connection links and said extraplanar links through optical switches.

6. The method of claim 5, wherein said optical switches include a plurality of 5 I/O ports.

7. The method of claim 1, wherein said recursive mesh network comprises an optical mesh, said connection links comprise optical channels, and said connection steps (b) and (e) include connecting access stations to said optical channels.

8. The method of claim 1, wherein said recursive mesh network comprises a fiber mesh, said connection links comprise fiber links, and said connection steps (b) and (e) include connecting access stations to said fiber links.

9. The method of claim 1, wherein said step (b) comprises the steps of:

(i) assigning an access station at a region corner corresponding to a service area corner if a service area corner is available;

(ii) assigning an access station at a region corner corresponding to a non-corner service area side if no service area corner is available and a service area side is available; and (iii) assigning an access station at a region corner that does not correspond to a service area corner or side if no service area corner or side is available.

10. The method of claim 9, wherein said step (e) comprises the steps of:

(i) assigning an access station at a sub-region corner corresponding to a non-corner region side if a region side is available; and (ii) assigning an access station at a sub-region corner that does not correspond to a region corner or side if no service area side is available.

11. The method of claim 1, wherein all M and N variables have an identical value.

12. Apparatus for providing a recursive mesh network for connecting a plurality number of access stations within a service area by connecting links, comprising:

(a) first dividing means for dividing said service area into M×N regions, having (M+1)×(N+1) corners, M and N being integers ≧2, wherein each side of each region corresponds to a bidirectional connection link;

(b) first assignment means, coupled to said first dividing means, for assigning a new access station at an unoccupied region corner and connecting said new access station to corresponding connection links, until (M+1)× (N+1) access stations have been connected;

(c) locator means, coupled to said first assignment means, for determining, for each additional new access station, after all (M+1)×(N+1) region corner have been occupied, which of said regions said additional new access station falls within;

(d) second dividing means, coupled to said locator means, for dividing said determined region into M'×N' sub-regions having (M'+1)×(N'+1) sub-region corners, M' and N' being inters ≧2, when said determined region has not been divided;

(e) second assignment means, coupled to said second dividing means, for assigning said additional new access station at an available corner of said sub-region and connecting said new additional access station to bidirectional connection links that lead to at least one other access station within the same sub-region, when said divided determined sub-region has less than (M'+1)×(N'+1) access stations within it; and (f) repeat means, coupled to said locator, second dividing and second assignment means, for causing said locator, second dividing and second assignment means to act with respect to said divided determined sub-region until said new additional access station is connected when said divided determined sub-region has (M'+1)×(N'+1) access stations therewithin,.

13. The apparatus of claim 12, further including:

(g) third assignment means, coupled to said locator means, for adding at least one extraplanar-link to said recursive mesh network, wherein each extraplanar link connects a first access station within said recursive mesh network to a second access station within said recursive mesh network.

14. The apparatus of claim 13, wherein said first and second access stations are selected in response to current prevailing traffic patterns within the service area.

15. The apparatus of claim 13, wherein at least one extraplanar link is bidirectional.

16. The apparatus of claim 13, wherein said access stations are connected to said connection links and said extraplanar links through optical switches.

17. The apparatus of claim 16, wherein said optical switches include a plurality of 5 I/O ports.

18. The apparatus of claim 1, wherein said recursive mesh network comprises an optical mesh and said connection links comprise optical virtual channels.

19. The apparatus of claim 1, wherein said recursive mesh network comprises a fiber mesh and said connection links comprise fiber links.

20. The apparatus of claim 12, wherein said first assignment means comprises:

(i) means, coupled to said first assignment means, for assigning an access station at a region corner corresponding to a service area corner if a service area corner is available;

(ii) means, coupled to said first assignment means, for assigning an access station at a region corner corresponding to a non-corner service area side if no service area corner is available and a service area side is available; and (iii) means, coupled to said first assignment means, for assigning an access station at a region corner that does not correspond to a service area corner or side if no service area corner or side is available.

21. The apparatus of claim 20, wherein said second assignment means comprises:

(i) means, coupled to said second assignment means, for assigning an access station at a sub-region corner corresponding to a non-corner region side if a region side is available; and (ii) means, coupled to said second assignment means, for assigning an access station at a sub-region corner that does not correspond to a region corner or side if no service area side is available.

22. The apparatus of claim 12, wherein all M and N variables have an identical value.

23. A telecommunications network connecting a plurality of users within a service area by a recursive mesh network, comprising:

(a) a plurality of access stations, at least two access stations being capable of being accessed by at least one user; and (b) a plurality of bidirectional connection links for connecting each of said access stations to at least one other access station, wherein said connection links connect said access stations as said recursive mesh network.

24. The telecommunications network of claim 23, further including one or more extraplanar links, wherein each extraplanar link connects an access station within said recursive mesh network to a different access station within said recursive mesh network.

25. The telecommunications network of claim 24, wherein said access stations are selected based upon current prevailing traffic patterns within the service area.

26. The telecommunications network of claim 24, wherein at least one extraplanar link is bidirectional.

27. The telecommunications network of claim 24, further including a plurality of switches, wherein each of said access stations is connected to its connection and extraplanar links by a switch.

28. The telecommunications network of claim 27, wherein said switches include a plurality of I/O ports.

29. The telecommunications network of claim 24, wherein said recursive mesh network comprises an optical mesh and said connection and extraplanar link comprise optical channels, so that said access stations are connected to said optical channels to form an optical mesh network with extraplanar optical links.

30. The telecommunications network of claim 24, wherein said recursive mesh network comprises a fiber mesh and said connection and extraplanar links comprise fiber channels, so that said access stations are connected to said fiber channels to form a fiber mesh network with extraplanar fiber links.

31. A method for routing information in a recursive mesh network to connect a first access station A at location $(x_A, y_A)$ to a second access station B at location $(x_B, y_B)$, wherein each access station within said network stores data sufficient to route said information to all other access stations no more than a preselected number of hops away in a local table T, each access station at a head-end stores the shortest path to every other access station within that head-end region in a local table H, and each access station within an incomplete grid stores the shortest path to the nearest head-end in a local table H, comprising the steps of:

(a) using the local routing table T of access station A to reach access station B from access station A if said table T contains the address of B; if said table T does not contain the address of B:

(b) routing along the connection paths of said network using local tables T in such a way that the distance to said access station B is reduced at each intermediate node if such routing is possible; if such routing is not possible due to blocking at node C, then:

(c) routing from access station C to access station B, by:
  (i) using the local routing table H of access station C to reach an access station C' at the head-end of C;
  (ii) routing along the x connection paths and the y connection paths of said network from access station C' to access station B' in such a way that the distance to said access station B' is reduced at each intermediate node, wherein access station B' lies at the head-end of B; and
  (iii) using the local routing table H of access station B' to reach access station B.

32. A method for routing information in a recursive mesh network to connect a first access station A at location $(x_A, y_A)$ to a second access station B at location $(x_B, y_B)$, wherein each access station within said network stores data sufficient to route said information to all other access stations no more than a preselected number of hops away in a local table T, and D(A,B) is defined as the distance between said access station A and said access station B, comprising the steps of:

(a) starting at access station A;
 (b) routing from the present access station P to a new access station X if P and X share a connection path and D(X,B)<D (P,B); and
 (c) when P and X are do not share a connection path or D(X,B)>D (P,B):
  (i) routing from said present access station P to the access station L at the left of said access station P;
  (ii) routing to the access station R at the right of said access station L; and
  (iii) repeating step (c)(ii) until D(R,B)<D(Q,B) for all Q ∈ N, wherein N is the set of all access stations visited during such routing;
 (d) repeating steps (b) and (c) until access station B is connected.

33. The method of claim 32, wherein D(A,B) is defined as being equal to the sum of the absolute value of $(x_A-x_B)$ and the absolute value of $(y_A-y_B)$.

34. The method of claim 32, wherein $D(A,B)= \sqrt{(X_a-X_B)^2+(Y_A Y_B)^2}$.

35. An apparatus for routing information in a recursive mesh network to connect a first access station A at location $(x_A, y_A)$ to a second access station B at location $(x_B, y_B)$, wherein each access station within said network stores data sufficient to route said information to all other access stations no more than a preselected number of hops away in a local table T, each access station at a head-end stores the shortest path to every other access station within that head-end region in a local table H, and each access station within an incomplete grid stores the shortest path to the nearest head-end in a local table H, comprising:

(a) first memory means for using the local routing table T of access station A to reach access station B from access station A if said table T contains the address of B;
 (b) first routing means, coupled to said first memory means, for routing along the connection paths of said network using local tables T in such a way that the distance to said access station B is reduced at each intermediate node if such routing is possible, if said table T of access station A does not contain the address of B;
 (c) second routing means, coupled to said first routing means, for routing from access station C to access station B if said first routing means is not able to route due to blocking at node C, wherein said second routing means includes:
  (i) second memory means, coupled to said second routing means, for using the local routing table H of access station C to reach an access station C' at the head-end of C;
  (ii) third routing means, coupled to said second routing means, for routing along the x connection paths and the y connection paths of said network from access station C' to access station B' in such a way that the distance to said access station B' is reduced at each intermediate node, wherein access station B' lies at the head-end of B; and
  (iii) third memory means, coupled to said second routing means, for using the local routing table H of access station B' to reach access station B.

36. An apparatus for routing information in a recursive mesh network to connect a first access station A at location $(x_A, y_A)$ to a second access station B at location $(x_B, y_B)$, wherein each access station within said network stores data sufficient to route said information to all other access stations no more than a preselected number of hops away in a local table T, and D(A,B) is defined as the distance between said access station A and said access station B, comprising:

(a) initiation means for starting at access station A;
 (b) first routing means, coupled to said initiation means, for routing from the present access station P to a new access station X if P and X share a connection path and D(X,B)<D (P,B);
 (c) second routing means, coupled to said initiation means, to route information when P and X do not share a connection path or D(X,B)>D (P,B), including:
  (i) left routing means, coupled to said second routing means, for routing from said present access station P to the access station L at the left of said access station P;
  (ii) right routing means, coupled to said second routing means, for repeatedly routing to the access station R at the right of the present access station until D(R,B)<D(Q,B) for all Q ∈ N, wherein N is the set of all access stations visited during such routing; and
 (d) repeat means, coupled to said first and second routing means, for causing said first and second routing means to rout said information until said station B is connected.

37. The apparatus of claim 36, wherein D(A,B) is defined as being equal to the sum of the absolute value of $(x_A-x_B)$ and the absolute value of $(y_A-y_B)$.

38. The apparatus of claim 36, wherein $D(A,B)= \sqrt{(X_a-X_B)^2+(Y_A Y_B)^2}$.

* * * * *

UNITED STATES PATENT AND TRADEMARK OFFICE
CERTIFICATE OF CORRECTION

PATENT NO. : 5,530,575
DATED : June 25, 1996
INVENTOR(S) : Acampora et al.

It is certified that error appears in the above-indentified patent and that said Letters Patent is hereby corrected as shown below:

Title page:

Item 73, "University" should read -- University in the City of New York --; Item 56, line 11, "Transactionson" should read -- Transactions on --. Col. 1, line 5, "gas" should read -- has --. Col. 6, line 32, "561, 552, 553 and 554" should read -- 561, 562, 563 and 564 --. Col. 12, line 37, "N')" should read -- N' --. Col. 14, line 41, "are do" should read -- do --. Col. 16, line 12, "principals" should read -- principles --. Col. 17, line 29, delete "such "destination routing" ". Col. 19, line 4, "comers" should read -- corners --. Col. 21, line 29, "node $n_g$" should read -- node $n_s$ --; line 30, "$D(n_g,n_d)$" should read -- $D(n_s,n_d)$ --; line 48, "$n_p$" should read -- $n_\ell$ --; line 65, "that" should read -- than --.

Col. 25, line 3, "corner" should read -- corners --.
Col. 27, line 24 "are do" should read -- do --; line 40, "$(X_a-X_B)^2$" should read -- $(X_A-X_B)^2$ --. Col. 28, line 50, "rout" should read -- route --; line 56, "$(X_a-X_B)^2$" should read -- $(X_A-X_B)^2$ --.

Signed and Sealed this

Fifth Day of November, 1996

Attest:

Attesting Officer

BRUCE LEHMAN
Commissioner of Patents and Trademarks